(12) United States Patent
Gidney et al.

(10) Patent No.: US 11,675,763 B2
(45) Date of Patent: Jun. 13, 2023

(54) PERFORMING UNITARY ITERATION AND INDEXED OPERATIONS

(71) Applicant: Google LLC, Mountain View, CA (US)

(72) Inventors: Craig Gidney, Goleta, CA (US); Ryan Babbush, Venice, CA (US)

(73) Assignee: Google LLC, Mountain View, CA (US)

( * ) Notice: Subject to any disclaimer, the term of this patent is extended or adjusted under 35 U.S.C. 154(b) by 31 days.

(21) Appl. No.: 16/976,368

(22) PCT Filed: Apr. 19, 2019

(86) PCT No.: PCT/US2019/028227
§ 371 (c)(1),
(2) Date: Aug. 27, 2020

(87) PCT Pub. No.: WO2019/024678
PCT Pub. Date: Oct. 24, 2019

(65) Prior Publication Data
US 2021/0157781 A1  May 27, 2021

Related U.S. Application Data

(60) Provisional application No. 62/660,494, filed on Apr. 20, 2018.

(51) Int. Cl.
*G06N 10/00* (2022.01)
*G06F 16/22* (2019.01)

(52) U.S. Cl.
CPC ......... *G06F 16/2228* (2019.01); *G06N 10/00* (2019.01)

(58) Field of Classification Search
CPC .... G06F 16/2228; G06N 10/00; G06N 10/20; G06N 10/40; G06N 10/60; G06N 10/70; G06N 10/80
See application file for complete search history.

(56) References Cited

U.S. PATENT DOCUMENTS

| | | | | |
|---|---|---|---|---|
| 2008/0104088 A1* | 5/2008 | Kuriyama | ........... | G06F 16/9032 |
| 2011/0231462 A1* | 9/2011 | Macready | ............... | G06F 17/11 |
| | | | | 708/231 |
| 2016/0283857 A1* | 9/2016 | Babbush | ................. | G06F 15/82 |

FOREIGN PATENT DOCUMENTS

JP     4700413     6/2011

OTHER PUBLICATIONS

Andrew M. Childs, Dmitri Maslov, Yunseong Nam, Neil J. Ross, Yuan Su, "Toward the first quantum simulation with quantum speedup" Nov. 29, 2017,https://arxiv.org/pdf/1711.10980.pdf (Year: 2017).*

Attaccalite et al., "Correlation energy and spin polarization in the 2D electron gas," Physical Review Letters, Jun. 2002, 88(25):256601.

(Continued)

*Primary Examiner* — Allen S Lin
(74) *Attorney, Agent, or Firm* — Fish & Richardson P.C.

(57) ABSTRACT

Methods, systems and apparatus for performing indexed operations using a unary iteration quantum circuit. In one aspect, a method includes encoding an index value in an index register comprising index qubits; encoding the index value in a control register comprising multiple control qubits; and repeatedly computing and uncomputing the control qubits to perform, conditioned on the state of the control qubits, the operation on one or more target qubits corresponding to the index value, wherein during the encoding, computing and uncomputing: the multiple control qubits are made available in sequence, and the multiple control qubits correspond to a one-hot encoding of the encoded index value.

31 Claims, 13 Drawing Sheets

(56) References Cited

OTHER PUBLICATIONS

Babbush et al., "Asymptotically Optimal LCU Based Second Quantized Quantum Simulation of Correlated Electrons" Feb. 2018.
Babbush et al., "Encoding electronic spectrain quantum circuits with linear T complexity," Physical Review X., Oct. 2018, 8(4):041015.
Babbush et al., "Low Depth Quantum Simulation of Electronic Structure," arXiv:1706.0023, May 2017.
Babbush et al., "Exponentially more precise quantum simulation of fermions in second quantization," New Journal of Physics, Mar. 2016,18(3):033032.
Berry et al., "Efficient Quantum Algorithms for Simulating Sparse Hamiltonians," Communications in Mathematical Physics, Mar. 2007, 270(2):359-71.
Berry et al., "Improved Techniques for Preparing Eigenstates of Fermionic Hamiltonians," arXiv:1711.10460, May 2017, 4(1):1-7.
Berry et al., "Simulating Hamiltonian dynamics with a truncated Taylor series," Physical review letters, Mar. 2015, 114(9):090502.
Brack et al., "The physics of simple metal clusters: self-consistent jellium model and semiclassical approaches," Reviews of modern physics, Jul. 1993, 65(3):677.
Ceperley et al., "Ground state of the electron gas by a stochastic method," Physical Review Letters, Aug. 1980 45(7):566.
Childs et al., "Toward the first quantum simulation with quantum speedup," Proceedings of the National Academy of Sciences, Sep. 2018, 115(38):9456-61.
Cuccaro et al., "A new quantum ripple-carry addition circuit," arXiv preprint quant-ph/0410184, Oct. 2004, 9 pages.
Drummond et al., "Phase diagram of the low-density two-dimensional homogeneous electron gas," Physical Review Letters, Mar. 2009, 102(12):126402.
Freeman, "Coupled-cluster expansion applied to the electron gas: Inclusion of ring and exchange effects," Physical Review B., Jun. 1977, 15(12):5512.
Gell-Mann et al., "Correlation energy of an electron gas at high density," Physical Review, Apr. 1957, 106(2):364.
Gidney et al., "Halving the cost of quantum addition," arXiv:1709.06648, Jun. 2018, 2:74.
Jones C. Low-overhead constructions for the fault-tolerant Toffoli gate. Physical Review A. Feb. 20, 2013;87(2):022328.
Low et al., "Hamiltonian Simulation by Qubitization," arXiv: 1610.06546, Jul. 2019, 3:163.
Low et al., "Optimal Hamiltonian Simulation by Quantum Signal Processing," Physical Review Letters, Jan. 2017, 118(1):10501.
McClean et al., "OpenFermion: the electronic structure package for quantum computers," Quantum Science and Technology, Apr. 2020.
Motta et al., "Imaginary time density-density correlations for two-dimensional electron gases at high density," The Journal of chemical physics, Oct. 2015, 143(16):164108.
Nielsen et al., "Quantum Computation and Quantum Information passage," Cambridge University Press, Jan. 2010, 8 pages.
PCT International Search Report and Written Opinion in International Appln. No. PCT/US2019/028227, dated Jul. 18, 2019, 21 pages.
PCT International Search Report and Written Opinion in International Appln. No. PCT/US2019/028227, dated Oct. 29, 2020, 13 pages.
Perdew et al., "Erratum: Accurate and simple analytic representation of the electron-gas correlation energy [Phys. Rev. B 45, 13244 (1992)]," Physical Review B., Aug. 2018, 98(7):079904.
Poulin et al., "Fast Quantum Algorithm for Spectral Properties", arxiv.org, Cornell University Library, Olin Library Cornell University Ithaca, NY 14853, Nov. 2017.
Shende et al., "Synthesis of quantum-logic circuits," IEEE Transactions on Computer-Aided Design of Integrated Circuits and Systems, May 2006, 25(6):1000-10.
Shepherd et al., "Full conguration interaction perspective on the homogeneous electron gas," Physical Review B., Feb. 2012, 85(8)81103.
Shepherd et al., "Investigation of the full conguration interaction quantum Monte Carlo method using homogeneous electron gas models," The Journal of Chemical Physics, Jun. 2012, 136(24): 244101.
Spink et al., "Quantum Monte Carlo study of the three-dimensional spin-polarized homogeneous electron gas," Physical Review B., Aug. 2013, 88(8):85121.
Spivak et al., "Colloquium: Transport in strongly correlated two dimensional electron uids," Reviews of Modern Physics, May 2010, 82(2):1743.
Tanatar et al., "Ground state of the two-dimensional electron gas," Physical Review B., Mar. 1989, 39(8):5005.
Vosko et al., "Accurate spin-dependent electron liquid correlation energies for local spin density calculations: a critical analysis," Canadian Journal of physics, Aug. 1980, 58(8):1200-11.
Wigner et al., "On the interaction of electrons in metals," Physical Review, Dec. 1934, 46(11):1002.
Wilson et al., "A constrained path auxiliary-field quantum Monte Carlo method for the homogeneous electron gas," Journal of Physics: Condensed Matter, Jul. 1995, 7(28):L371.
Zong et al., "Spin polarization of the low-density three-dimensional electron gas," Physical Review E., Sep. 2002, 66(3):036703.
CA Office Action in Canadian Application No. 3,093,713, dated Sep. 28, 2021, 3 pages.
EP Office Action in European Appln. No. 19722390.2, dated Aug. 18, 2022, 12 pages.

\* cited by examiner

PERFORMING UNITARY ITERATION AND INDEXED OPERATIONS

CROSS-REFERENCE TO RELATED APPLICATION

This application is a National Stage Application under 35 U.S.C. § 371 and claims the benefit of International Application No. PCT/US2019/028227, filed Apr. 19, 2019, which claims priority to U.S. Application No. 62/660,494, filed Apr. 20, 2018, the disclosure of which is incorporated herein by reference.

BACKGROUND

A quantum circuit is a model for quantum computation in which a computation is a sequence of quantum logic gates—reversible transformations on an n-qubit register.

SUMMARY

The subject matter of the present specification relates to technologies for producing quantum circuits, such as quantum circuits for performing indexed operations, herein referred to as unitary iteration quantum circuits.

In general, one innovative aspect of the subject matter described in this specification can be implemented in a method for performing unary iteration to implement an indexed operation using a unary iteration quantum circuit, the method comprising: encoding an index value in an index register comprising index qubits; encoding the index value in a control register comprising multiple control qubits; and repeatedly computing and uncomputing the control qubits to perform, conditioned on the state of the control qubits, the operation on one or more target qubits corresponding to the index value, wherein during the encoding, computing and uncomputing: the multiple control qubits are made available in sequence, and the multiple control qubits correspond to a one-hot encoding of the encoded index value.

Other implementations of this aspect include corresponding classical or quantum computer systems, apparatus, and computer programs recorded on one or more computer storage devices, each configured to perform the actions of the methods. A system of one or more classical or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations encoding the index value in the control register comprising multiple control qubits comprises iteratively computing multiple logical AND operations between respective pairs of control qubits and index qubits to store a result of a logical AND operation between an inverse of a least significant index qubit and a penultimate control qubit storing a result of a previous logical AND operation in a final control qubit.

In some implementations iteratively computing multiple logical AND operations between respective pairs of control qubits and index qubits to store a result of a logical AND operation between an inverse of the least significant index qubit and a control qubit storing the result of a previous logical AND operation comprises: for a first iteration, performing a logical AND operation between a first control qubit and an inverse of the most significant index qubit, and storing the result of the logical AND operation in a second control qubit; and for a subsequent iteration, performing a logical AND operation between a control qubit storing the result of a logical AND operation for the previous iteration and an inverse of the index qubit for the iteration, and storing the result of the logical AND operation in a subsequent control qubit.

In some implementations the first control qubit is initially set in an ON state.

In some implementations repeatedly computing and uncomputing the control qubits comprises repeatedly, for each target qubit in sequence: determining whether the final control qubit is in an ON state, and in response to determining that the final control qubit is in an ON state, performing the operation on the target qubit; determining a number of uncomputations of the iteratively computed logical AND operations between respective pairs of control qubits and index qubits to perform; iteratively performing the determined number of uncomputations; performing a CNOT operation between a control qubit corresponding to the last uncomputed logical AND operation and a next highest control qubit, wherein the next highest control qubit acts as a control for the CNOT operation; iteratively computing a number of logical AND operations between respective pairs of control qubits and index qubits to re-compute the final control qubit.

In some implementations determining a number of uncomputations of the iteratively computed logical AND operations between respective pairs of control qubits and index qubits to perform comprises: determining how many bits are flipped when changing a binary representation of an index value corresponding to a final control qubit to the next; and determining the number of uncomputations as the determined number of bit flips minus one In some implementations determining a number of uncomputations of the iteratively computed logical AND operations between respective pairs of control qubits and index qubits to perform comprises determining a number of times it is possible to divide the index value in base 10 by 2 before a non-integer is obtained.

In some implementations the method further comprises uncomputing the iteratively computed multiple logical AND operations between respective pairs of control qubits and index qubits to reset the index register to encode the index value.

In some implementations the multiple logical AND comprise temporary AND operations that are defined in terms of Toffoli gates and Clifford+T gates.

In some implementations each logical AND operation require 4 T gates.

In some implementations the total number of AND operations included in the unary iteration circuit is equal to the total number of target qubits N minus 1.

In some implementations performing the indexed operation has a T count of 4(L−1).

In some implementations the method further comprises merging the CNOT operations to generate an optimized unary iteration circuit for performing the indexed operation. In some implementations the indexed operation comprises a ranged indexed operation, and wherein the unary iteration quantum circuit further comprises an accumulator qubit.

In some implementations performing the ranged indexed operation comprises applying CNOT operations between the accumulator qubit and each iterated final control qubit, the iterated final control qubit acting as the control.

In some implementations the unary iteration circuit is constructed by: defining a total-control circuit for implementing the indexed operation; applying a set of transformations to the total-control circuit to generate a first transformed circuit, comprising: for each possible index, removing a control on an index qubit representing $2^b$ when the result of the bitwise-or operator applied to the index and $2^b$ is greater than or equal to L and the result of the bitwise-and operator applied to L−1 and $2^b$ is equal to $2^b$, wherein b represents a binary index; and expanding the remaining controls into nested AND operations; applying a set of optimizations to the first transformed circuit to generate the unary iteration circuit, comprising: removing adjacent uncomputations and re-computations of AND operations if the control types match; replacing adjacent uncomputations and re-computations of AND operations with CNOT and NOT operations if the control types do not match.

In some implementations the nested AND operations are nested so that lower controls are inside higher controls.

In some implementations during expansion of the remaining controls, a control qubit associated with an AND operation is placed directly below its lowest input qubit.

In general, another innovative aspect of the subject matter described in this specification can be implemented in a method for operating a quantum read-only memory, the method comprising: encoding an index value in an index register comprising one or more index qubits; encoding the index value in a control register comprising multiple control qubits; and repeatedly computing and uncomputing the control qubits to load, conditioned on the state of the control qubits, a data item corresponding to the index value to a data register of data qubits, wherein during the encoding, computing and uncomputing: the multiple control qubits are made available in sequence, and the multiple control qubits correspond to a one-hot encoding of the stored index.

Other implementations of this aspect include corresponding classical or quantum computer systems, apparatus, and computer programs recorded on one or more computer storage devices, each configured to perform the actions of the methods. A system of one or more classical or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the index value in the control register comprising multiple control qubits comprises: iteratively computing multiple logical AND operations between respective pairs of control qubits and index qubits to store a result of a logical AND operation between an inverse of a least significant index qubit and a penultimate control qubit storing a result of a previous logical AND operation in a final control qubit.

In some implementations iteratively computing multiple logical AND operations between respective pairs of control qubits and index qubits to store a result of a logical AND operation between an inverse of the least significant index qubit and a control qubit storing the result of a previous logical AND operation comprises: for a first iteration, performing a logical AND operation between a first control qubit and an inverse of the most significant index qubit, and storing the result of the logical AND operation in a second control qubit; and for a subsequent iteration, performing a logical AND operation between a control qubit storing the result of a logical AND operation for the previous iteration and an inverse of the index qubit for the iteration, and storing the result of the logical AND operation in a subsequent control qubit.

In some implementations the first control qubit is initially set in an ON state.

In some implementations repeatedly computing and uncomputing the control qubits comprises, for each repetition: determining whether the final control qubit is in an ON state; in response to determining that the final control qubit is in an ON state, performing a multi target CNOT operation on the data register qubits, wherein the multi target CNOT operation is dependent on a binary encoding of the data item and is controlled by the final control qubit; determining a number of uncomputations of the iteratively computed logical AND operations between respective pairs of control qubits and index qubits to perform; iteratively performing the determined number of uncomputations; performing a CNOT operation between a control qubit corresponding to the last uncomputed logical AND operation and a next highest control qubit, wherein the next highest control qubit acts as a control for the CNOT operation; iteratively computing a number logical AND operations between respective pairs of control qubits and index qubits to re-compute the final control qubit.

In some implementations determining a number of uncomputations of the iteratively computed logical AND operations between respective pairs of control qubits and index qubits to perform comprises: determining how many bits are flipped when changing a binary representation of an index value corresponding to a final control qubit to the next; and determining the number of uncomputations as the determined number of bit flips minus one.

In some implementations determining a number of uncomputations of the iteratively computed logical AND operations between respective pairs of control qubits and index qubits to perform comprises determining a number of times it is possible to divide the index value in base 10 by 2 before a non-integer is obtained.

In some implementations the method further comprises uncomputing the iteratively computed multiple logical AND operations between respective pairs of control qubits and index qubits to reset the index register to encode the index value.

In some implementations the multiple logical AND comprise temporary AND operations that are defined in terms of Toffoli gates and Clifford+T gates.

In some implementations each logical AND operation require 4 T gates.

In some implementations the total number of AND operations included in a quantum read-only memory circuit is equal to the total number of data register qubits L minus 1.

In some implementations loading the data item has a T count of 4(L−1).

The subject matter described in this specification can be implemented in particular ways so as to realize one or more of the following advantages.

The presently described disclosure represents a significant and widely applicable improvement to the state of the art for performing indexed operations with low T gate counts.

For example, previously known quantum circuit constructions for performing indexed operations typically convert an index register storing an index in the interval [0, L) with a space overhead of L qubits. By comparison, the presently described unary iteration construction and technique is exponentially more efficient in space without any increased T gate complexity, requiring only log L control qubits. In addition, by utilizing a temporary AND construction for performing logical AND operations, the presently described unary iteration quantum circuit requires less T gates—only 4(L−1) T gates—compared to other quantum circuits when performing indexed operations and can be parallelized if needed without increasing the T-count. Since T gates are notoriously costly to prepare, the presently described unary iteration construction therefore provides a clear improvement over the state of the art.

The presently described unary iteration construction can be easily transformed or optimized, and can be applied to a variety of settings. For example, the unary iteration construction may be used to perform specific types of indexed operations such as ranged indexed operations.

As another example, the unary iteration construction can form the basis of an improved read-only QRAM, referred to herein as QROM. With L the number of words or data items in QROM and D the word or data item size in bits, the presently described unary iteration construction can be used to construct a serial QROM with a T-count of 4(L−1) and an ancilla (control qubit) count of log L. In addition, the QROM construction can be parameterized to achieve an improved T-count of O(N/k+kD) and an ancilla-count of O(kD), where k represents an arbitrary number that controls a qubit-count vs T-count tradeoff.

Another advantageous property of the presently described QROM is that the QROM does not have to be stored in qubits. Instead, quantum algorithms using QROM can have the relevant classical data encoded directly into the quantum circuits executing the algorithm. This makes it plausible for near-term error corrected quantum computers, with on the order of a hundred error corrected qubits, to use QROM.

The presently described QROM can provide improvements to a variety of applications including quantum simulations, the construction of data lookups for quantum machine learning algorithms, and generally any algorithm that includes loading data under superposition into the quantum computer.

Details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
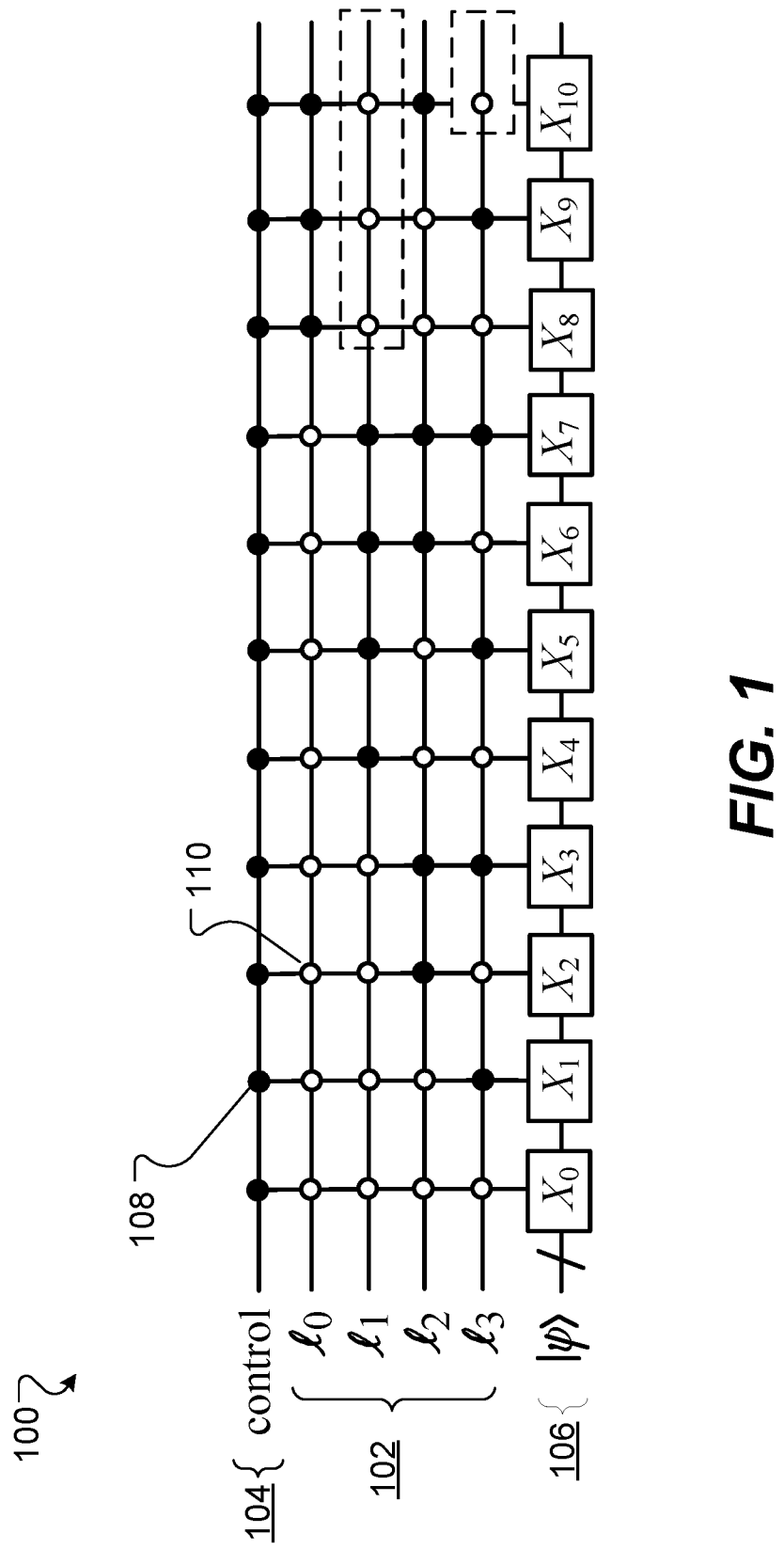
FIG. 1 shows an example total control circuit for performing a controlled indexed operation.

If efficiently realized, computations performed using a quantum computing device promise a computational speed-up for particular classes of problems over any computation that can be performed on a classical computer. Efficient realization of quantum computations depends on the design of the quantum computing device architecture, e.g., the design of the underlying quantum circuitry of the quantum computer. For example, a quantum circuit included in a quantum computing device should be space efficient. As another example, since T gates are an important component for building fault tolerant quantum circuits but are inherently expensive, a quantum computing device should have a low T count. In fact, constructing quantum circuits that perform certain computations with a reduced or even optimal number of T gates is an important task for near term realizations of quantum computing devices.

This specification describes a quantum circuit construction called a unary iteration quantum circuit for performing indexed operations. Indexed operations (including ranged indexed operations or other complex variants derived from indexed operations) are important building blocks for performing a wide range of computational tasks, e.g., data loading or encoding electronic structure spectra in quantum circuits.

Performing an indexed operation involves performing an operation on one or more target qubits conditioned on a bit value in an index register. The performed operation can, for example, be any single-qubit unitary. For example, this specification describes a quantum circuit construction and method for implementing indexed operations as given below in Equation (1).

$$|l\rangle|\psi\rangle \rightarrow |l\rangle G_l|\psi\rangle \qquad (1)$$

In Equation (1), G represents any single-qubit unitary operator, e.g., a Pauli operator, $|l\rangle$ represents an index register of qubits that encodes an index value l, $|\psi\rangle$ represents a target register of target qubits, and $|l\rangle G_l|\psi\rangle$ represents application of the operator G to an l-th target qubit (the qubit at offset l in the target register $|\psi\rangle$.) The operator G does not need to be the same across the whole target register of qubits. For example, the indexed operation G could be defined as one particular type of operation for an index register value smaller than some fixed value, and another particular type of operation for an index register value larger or equal than the same fixed value.

The unary iteration quantum circuit described in this specification is both space efficient and T count efficient, as described in more detail below. The space- and T-gate-count-efficiency is achieved by a unary iteration technique where qubits are made available one by one (iteration) and the values produced correspond to the one-hot (unary) bits of the index register's value. The one hot encoding means that the condition that the index register is storing a particular value corresponds to a specific qubit being set or not being set at a particular time in the circuit. For an index register storing an index in the interval [0, L), the space overhead of converting the index register into a unary register using currently known techniques is L qubits. By comparison, the unary iteration quantum circuits and techniques described in this specification are exponentially more space-efficient without any increased T complexity, requiring only log L control qubits. In addition, the unary iteration quantum circuits and techniques described in this specification have a T-count of at most 4L−4 and can be parallelized without increasing the T-count.

Conventional Techniques for Implementing Indexed Operations

A known, suboptimal way to implement an indexed operation, e.g., an indexed NOT gate $X_l$, includes totally controlling the application of $X_l$ on all possible binary values that could occur in the index register $|l\rangle$. For example, in order to apply $X_{158}$ when $|l\rangle = |158\rangle$, the total-control approach includes placing a NOT gate targeting the qubit at offset 158, but with a control on each index qubit. The control's type (ON or OFF) would be determined by the binary representation of 158 ($158_{10} = 10011110_2$), so there would be a must-be-OFF control on the low bit (least significant bit) of the index register (because the low bit of 158 in binary is 0), a must-be-ON control on the next bit (because the next bit of 158 in binary is 1), and so forth for the rest of the index bits (terminating at the most significant bit.) In order to cover every case, this process would be repeated for every integer from 0 up to L−1. This produces L different NOT operations, each targeting a different qubit in the target register and each having a number of controls equal to the size of the index register (i.e. log L). Thus, it takes O(L log L) T gates to apply Equation (1) using this approach. As described below, unary iteration asymptotically improves this T-count to 4L−4.

The unary iteration construction described in this specification can be defined by applying a specifically constructed fixed set of transformations and optimizations to the conventional total-control circuit, as described below with reference to FIGS. 1-5.

FIG. 1 shows an example total control circuit 100 for performing an indexed operation. For convenience, the example total control circuit 100 is described as performing a controlled indexed NOT operation $X_l$ with $0 \leq l \leq L = 11$, however the total control circuit may be used to perform other indexed operations and may be used to perform indexed operations with fewer or more indices.

The example total control circuit 100 includes an index register 102. In this example, the index register 102 includes four qubits $l_0$, $l_1$, $l_2$, $l_3$, with qubit $l_3$ storing the least significant bit, i.e., $2^0$, and qubit $l_0$ storing the most significant bit, i.e., $2^3$. The example total control circuit 100 further includes a control register 104. In this example, the control register 204 includes one qubit $|c\rangle$ =(control). The example total control circuit 100 further includes a system or target register 106. In this example, the target register 106 includes at least 11 target qubits which, for convenience, are represented as $|\psi\rangle = (\psi_0, \psi_1, \ldots, \psi_{10})^T$.

To perform a controlled NOT operation on a l-th target qubit using the total control circuit 100, a NOT gate $X_l$ targeting the l-th target qubit $\psi_l$ is placed in the target register. Controls corresponding to the value l are then placed on each index qubit in the index register. In the example total control circuit 100, black dots, e.g., dot 108, represent must-be-ON controls and empty circles, e.g., empty circle 110, represent must-be-OFF controls that correspond to the logical inverse of the input index qubit.

For example, to perform an indexed operation $X_5$ on target qubit $\psi_5$, the index register qubits are set to $l_0=0, l_1=1, l_2=0, l_3=1$ since the binary representation of 5 in a four bit register is 0101. Consequently, only the controls for the indexed operation $X_5$ in the total control circuit all have a truth value that corresponds to ON such that a NOT operation is performed only on the corresponding target qubit $\psi_5$.

A first set of specific transformations that are applied to the total control circuit 100 includes removing some of the total control circuit controls using the condition that the index register never encodes an out-of-range value l≥L. To illustrate, if the $X_{10}$ operation shown in FIG. 1 is not conditioned on the lowest bit (least significant bit) of the index register, an $X_{10}$ would also be applied to the target qubit when l=11. However, under the condition that l<L, this is not problematic and several controls can be omitted from the circuit under this condition. For each possible l the corresponding $X_l$ is considered and the control on the b-th index qubit is removed if the following conditions are true: (i) the b-th bit of L−1 is not set and (ii) setting the b-th bit of l would change l into a value larger than L−1. Visually, this removes "runs" of must-be-OFF controls as long as the run reaches the right side of the circuit.

After removing the above described controls, the remaining controls can be carefully expanded into nested AND operations, where the nests are nested so that lower controls are inside higher controls and control qubits associated with an AND operation are placed just below its lowest input qubit. Example AND operations defined in terms of Toffoli gates and Clifford+T gates are described below with reference to FIG. 2. FIG. 3 shows a transformed circuit achieved by removing the above described total control circuit controls and expanding the remaining controls into nested AND operations. By iteratively optimizing adjacent AND operations, using the relation illustrated in FIG. 4 below, the circuit shown in FIG. 3 is optimized into the unary iteration circuit, as described below with reference to FIG. 5.

Figure 2:
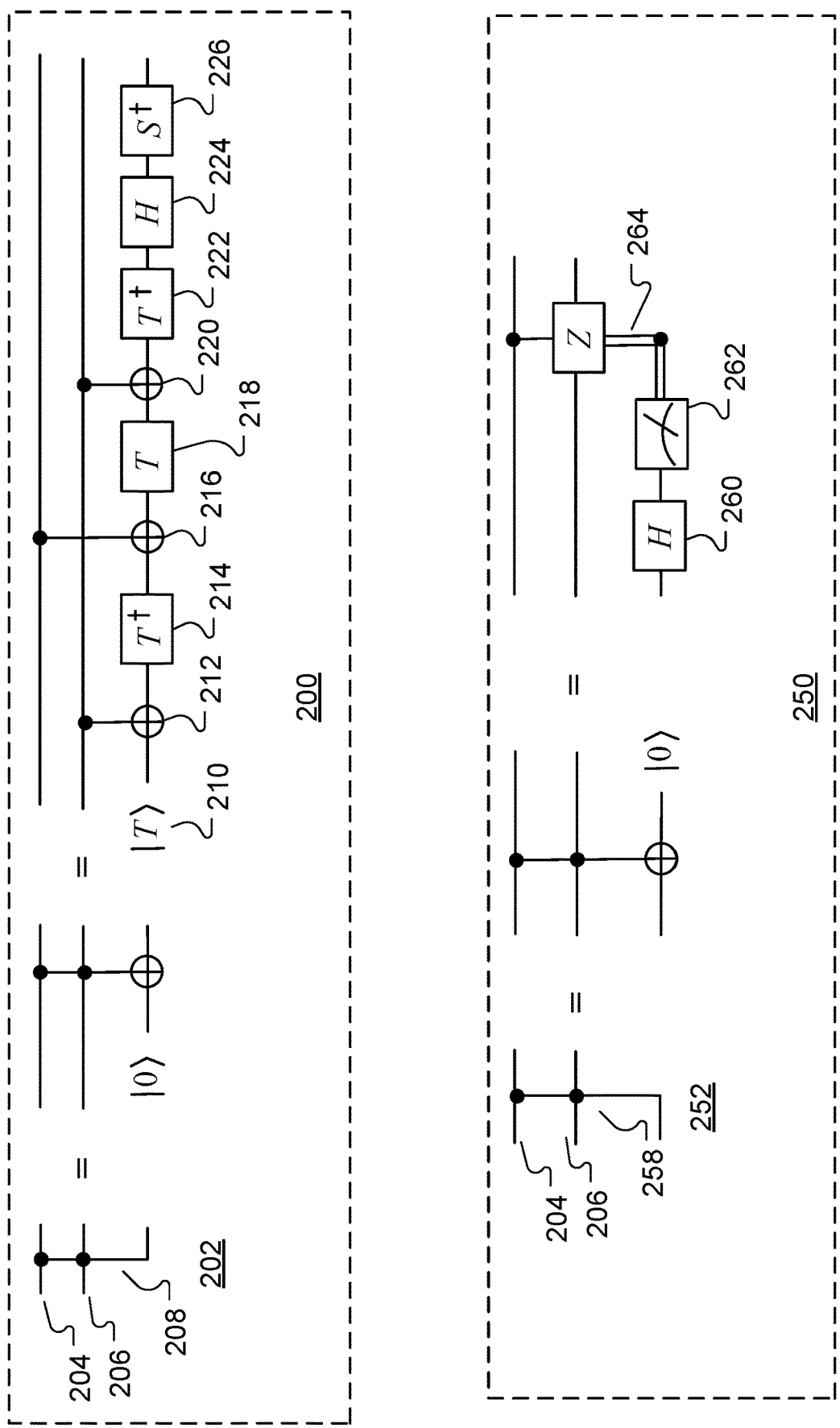
FIG. 2 shows an example circuit for performing logical AND operations.
Figure 3:
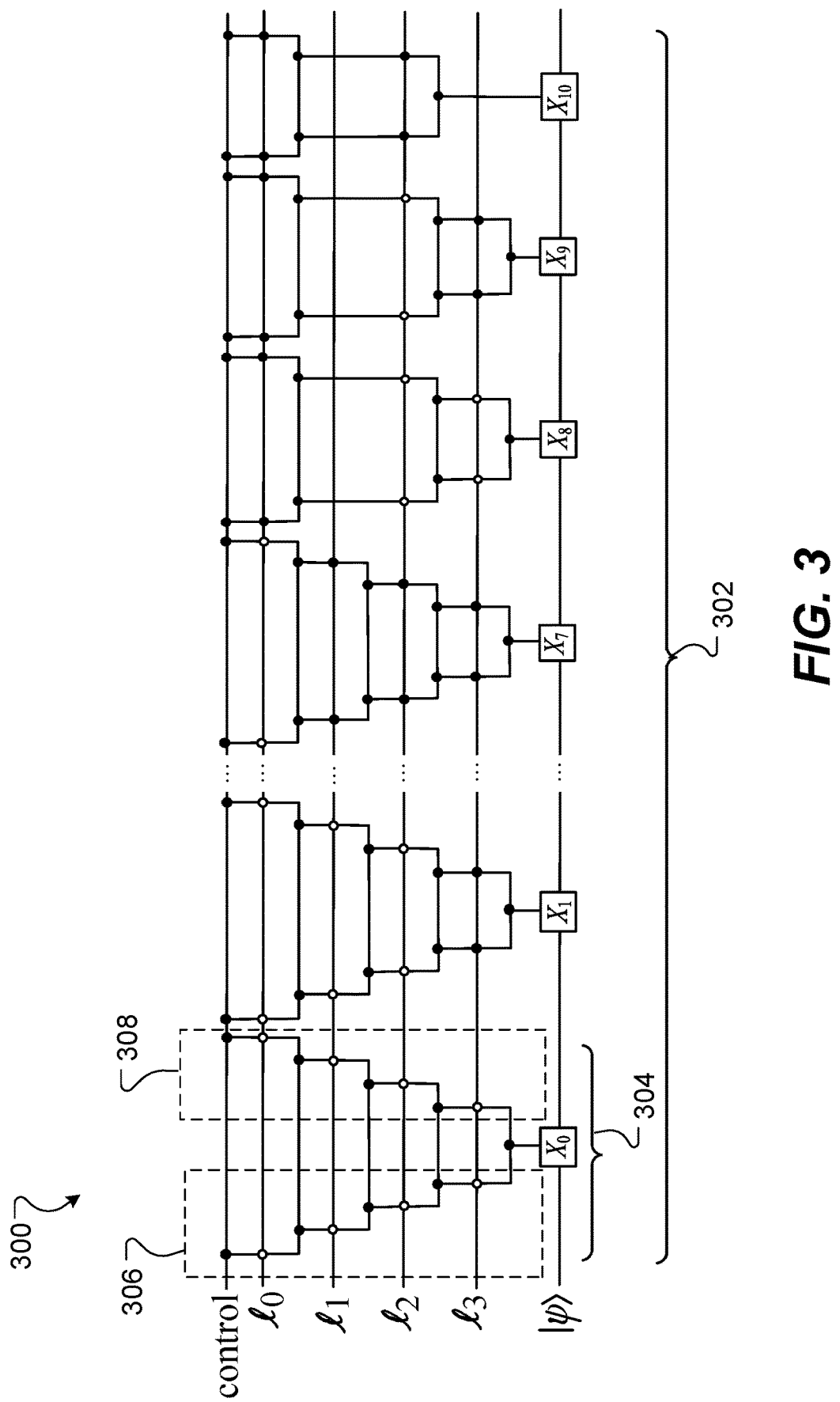
FIG. 3 shows an example transformed total control circuit.

FIG. 2 shows example circuits 200 and 250 for computing and uncomputing an AND operation. In FIG. 2, computing a logical AND operation 202 between two control qubits 204 and 206 is represented as a qubit wire 208 emerging vertically from the two controls on the control qubits 204 and 206 then heading rightwards. Uncomputing the logical AND operation is represented as a qubit wire 258 coming in from the left then merging vertically into the two control qubits 204 and 206 that created it.

To compute the logical AND operation 202, an ancilla qubit 210 in a T-state is obtained. A CNOT gate 212 between the control qubit 206 and the ancilla qubit 210 is applied. The Hermitian conjugate of a T gate 214 is applied to the ancilla qubit 210. A CNOT gate 216 is applied between the control qubit 204 and the ancilla qubit 210. A T gate 218 is applied to the ancilla qubit 210. A CNOT gate 220 is applied between the control qubit 206 and the ancilla qubit 210. In sequence, a Hermitian conjugate of a T gate 222, a Hadamard gate 224, and, optionally, a SWAP gate S 226 are applied to the ancilla qubit 210. The T count of the operation 202 is therefore 4 (including the T gate required to prepare the T-state of the ancilla qubit 210).

Uncomputing the logical AND operation 202 includes performing a measure-and-correct process. A Hadamard gate 260 is applied to the ancilla qubit 210. The ancilla qubit 210 is measured 262. A CZ gate 264 is applied to the control qubits 204, 206 if the generated measurement result from measurement operation 262 indicates that the two control qubits 204, 206 are both ON. The T count of the uncomputation is zero.

FIG. 3 shows an example transformed circuit 300 achieved by removing specific total control circuit controls from the total control circuit 100 described with reference to FIG. 1, and expanding remaining controls into nested AND operations.

The transformed circuit 300 shows a sawtooth pattern 302 where each tooth, e.g., tooth 304, is associated with one of the indexed NOT operations $X_l$ described above with reference to FIG. 1. Each tooth includes respective nested AND computations, e.g., nested AND operations 306, and subsequent respective uncomputations of the same AND operations, e.g., uncomputations 308, the computations and uncomputations being described above with reference to FIG. 2.

For example, the first tooth 304 corresponds to indexed operation $X_0$ and begins with computing a first logical AND between a first control qubit and the logical inverse of a first index register qubit $l_0$ that represents the most significant index register bit. The result of this operation is stored in a second control qubit. A second logical AND between the second control qubit storing the result of the previous AND operation and the logical inverse of a second index register qubit $l_1$ that represents the second most significant index register bit is computed. The result of this computation is stored in a third control qubit. A third logical AND between the third control qubit storing the result of the previous AND operation and the logical inverse of a third index register qubit $l_2$ that represents the third most significant index register bit is computed. The result of this computation is stored in a fourth control qubit. A fourth logical AND of the fourth control qubit storing the result of the previous AND operation and the logical inverse of a fourth index register qubit $l_3$ that represents the fourth most or, in this example, the least significant index register bit, is computed and the result is stored in a fifth or, in this example, final control qubit. If the truth value of the fifth control qubit corresponds to ON, the corresponding indexed operation $X_0$ controlled by the fifth control qubit is performed on the target qubit $\psi_0$. Afterwards, the previously described control qubits are uncomputed in an order reverse to the order they were computed in. Note that, during the computation phase 306 and uncomputation phase 308, the control qubits are made available in sequence.

Figure 4:
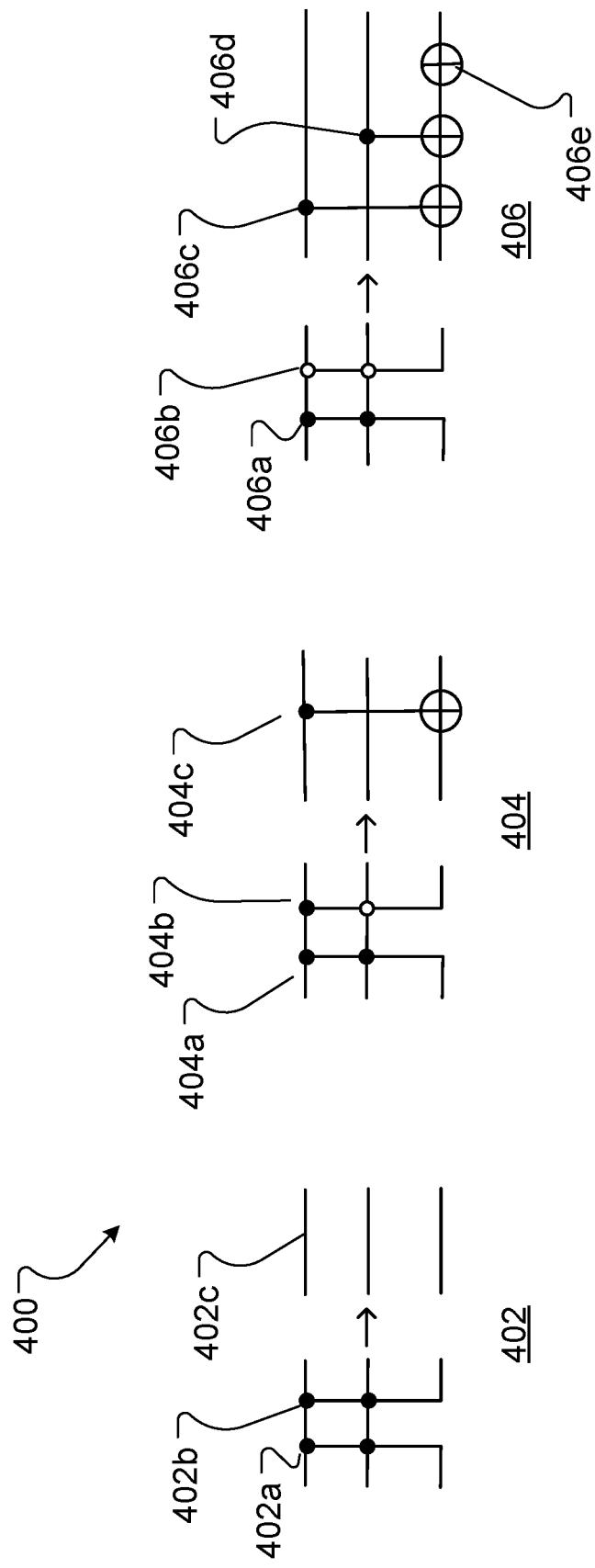
FIG. 4 is an illustration of how to optimize adjacent AND operations.

FIG. 4 is an illustration 400 of how to optimize adjacent AND operations for three exemplary cases. In total there are sixteen possible cases where an AND uncomputation is adjacent to an AND computation and all of them can be optimized into NOT or CNOT gates in an analogous manner. As shown in sub illustration 402, for adjacent uncomputation 402a and re-computation 402b of AND operations with must-be-ON controls, the controls can be removed 402c. As shown in sub illustration 404, an adjacent uncomputation 404a and re-computation 404b of AND operations where the second qubit in the AND re-computation 404b is a must-be-OFF control can be replaced by a CNOT operation 404c on the third qubit with the first qubit acting as the control. As shown in sub illustration 406, an adjacent uncomputation 406a and re-computation 406b of AND operations where both the first and second qubit in the AND re-computation is a must-be-OFF control can be replaced by a CNOT operation 406c on the third qubit with the first qubit acting as the control, followed by a CNOT operation 406d on the third qubit with the second qubit acting as the control, followed by a NOT operation 406e on the third qubit. Each merger 402, 404 and 406 saves 4 T gates.

Example Unary Iteration Quantum Circuits

Figure 5:
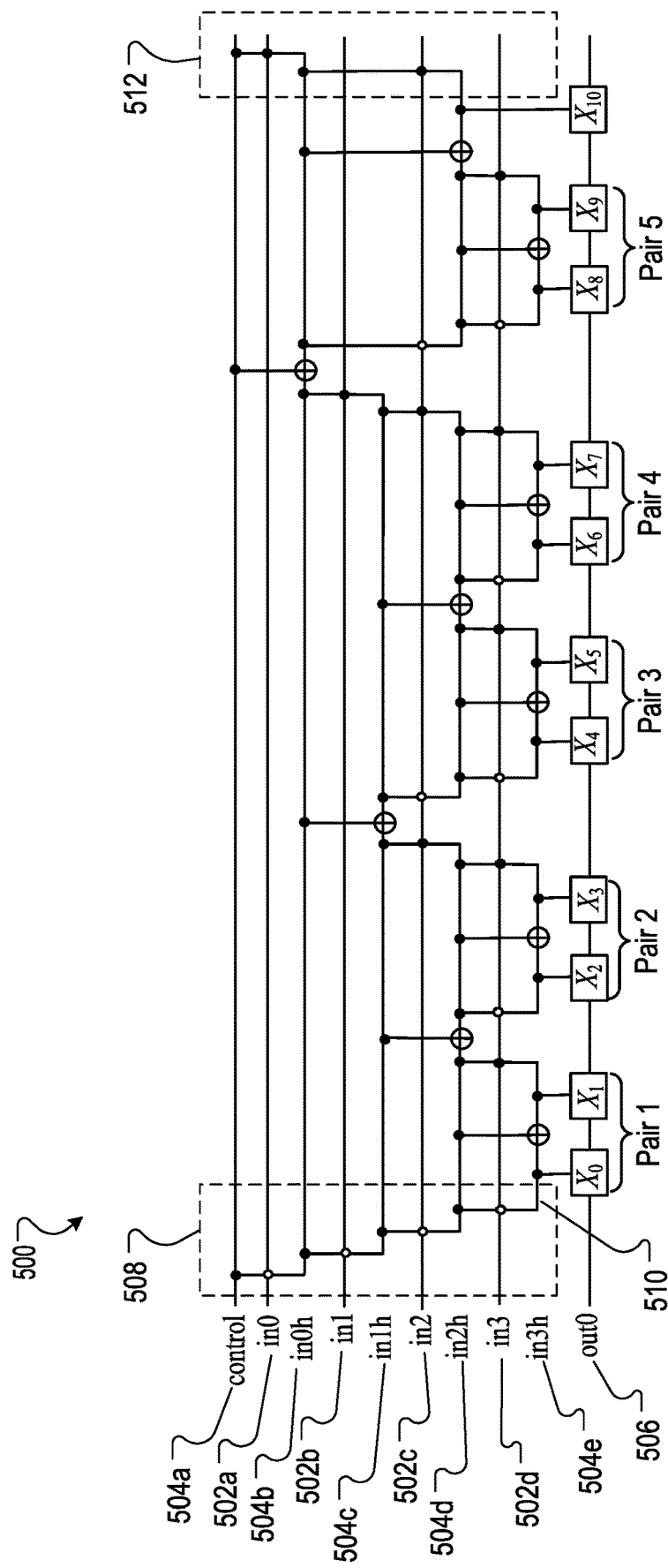
FIG. 5 shows an example unary iteration quantum circuit.

FIG. 5 shows an example unary iteration quantum circuit 500 for performing an indexed operation on a corresponding target qubit. For convenience and in line with FIG. 1 above, the example unary iteration quantum circuit 500 is illustrated as performing a controlled indexed operation $X_l$ with $0 \leq l \leq L = 11$, however the unary iteration quantum circuit may be used to perform other indexed operations and may be used to perform indexed operations with fewer or more indices, as shown below with reference to FIGS. 7A and 7B.

The example unary iteration quantum circuit 500 includes an index register including four index qubits 502a-d. The index register is configured to encode an index value. In some implementations, the index register may be configured to encode only in-range index values, i.e., index values less than L.

The example unary iteration quantum circuit 500 includes a control register including five control qubits 504a-e. The control qubits are interleaved with the index qubits to form a combined register, with the first control qubit 504a at the top of the combined register, followed by the index qubit 502a representing the most significant bit, followed by the second control qubit 504b, followed by the second index qubit 502b representing a second most significant bit, etc., until the penultimate control qubit 504d is followed by the index qubit 502d representing the least significant bit then the final control qubit 504e.

The example unary iteration quantum circuit 500 includes a target register 506 including multiple target qubits. For convenience, the target register 506 is drawn as a single wire in FIG. 5.

The control register encodes the index value encoded in the index register via an iterative cascade 508 of multiple logical AND operations performed between respective pairs of control qubits and index qubits, where each control qubit 504a-e is made available to the cascade of operations in sequence and not in parallel (in contrast to the total control circuit 100 described above with reference to FIG. 1). At the end of the iterative cascade 508, the result of the logical AND operation 510 between an inverse of the index qubit 502d representing the least significant bit and the penultimate control qubit 504d storing a result of a previous logical AND operation is stored in the final control qubit 504e. Each logical AND operation may be implemented using the circuitry described above with reference to FIG. 2.

The example unary iteration quantum circuit 500 repeatedly computes and uncomputes the control qubits 504b-e to perform the operation on a corresponding target qubit in the target register 506. The number of repetitions included in a unary iteration quantum circuit depends on the number of distinct operations that may be applied to the target register and/or the number of index qubits in the index register. For example, the example unary iteration quantum circuit 500 includes four index qubits 502a-d and eleven distinct operations (since the number of controlled X operations on different targets in the register is eleven). Therefore, in this case, the number of compute/un-compute repetitions is equal to 11−1=10 (intuitively, this is because if numbers 1 through 10 are recognized, number 11 can be performed unconditionally and then undone as part of the 1 through 10 parts).

Figure 9:
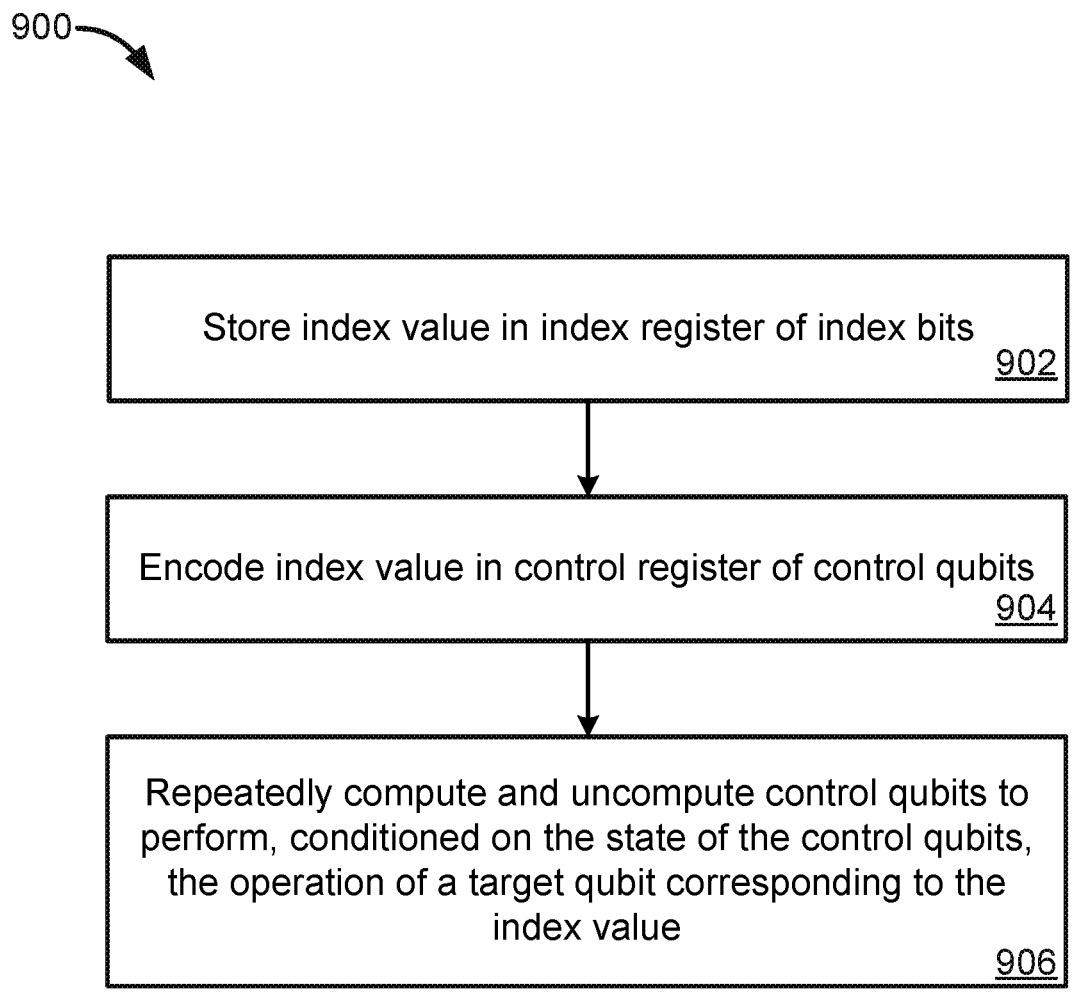
FIG. 9 is a flowchart of an example process for performing an indexed operation using a unary iteration quantum circuit.

A repetition of computing and uncomputing the control qubits includes performing the operation on a target qubit for the repetition if the final control qubit is in an ON state, iteratively un-computing a number of logical AND operations (as described in more detail below with reference to FIG. 9), performing a CNOT operation between a control qubit corresponding to the last uncomputed logical AND operation and a next highest control qubit, wherein the next highest control qubit acts as a control for the CNOT operation, and iteratively computing a number of logical AND operations to re-compute the final control qubit (as described in more detail below with reference to FIG. 9).

For example, in a first repetition, the operation X is performed on a target qubit corresponding to index value 0 if the final control, qubit 504e is in an ON state. No uncomputations of logical AND operations are then performed (as explained below with reference to FIG. 9). A CNOT operation is then performed between the final control qubit 504e and the next highest control qubit 504d. No computations of logical AND operations are then performed, since no uncomputations were performed.

In a second repetition, the operation X is performed on a target qubit corresponding to index value 1 if the final control qubit 504e is in an ON state. One uncomputation of a logical AND operation is then performed (as explained below with reference to FIG. 9). A CNOT operation is then performed between the control qubit 504d and the next highest control qubit 504c. One logical AND operations is then computed.

The circuit ends by uncomputing the iteratively computed cascade 508 of logical AND operations using a second cascade 512 of uncomputations. Each control qubit 504a-e is made available to the cascade 512 of uncomputations in sequence and not in parallel.

The example unary iteration quantum circuit 500 uses 10 logical AND operations. Since each AND operation requires 4 T gates (see FIG. 3 above), and no T gates to un-compute, and there are no other T-consuming operations in the circuit, the T count of the circuit 500 is 40=4(L−1) where in this case L=11.

The example circuit 500 is a specific example of a unary iteration quantum circuit, and various extensions or variations of the circuit 500 exist. For example, a unary iteration quantum circuit can be constructed for any number of target qubits, two examples of which are given below in FIGS. 7A and 7B.

Figure 8A:
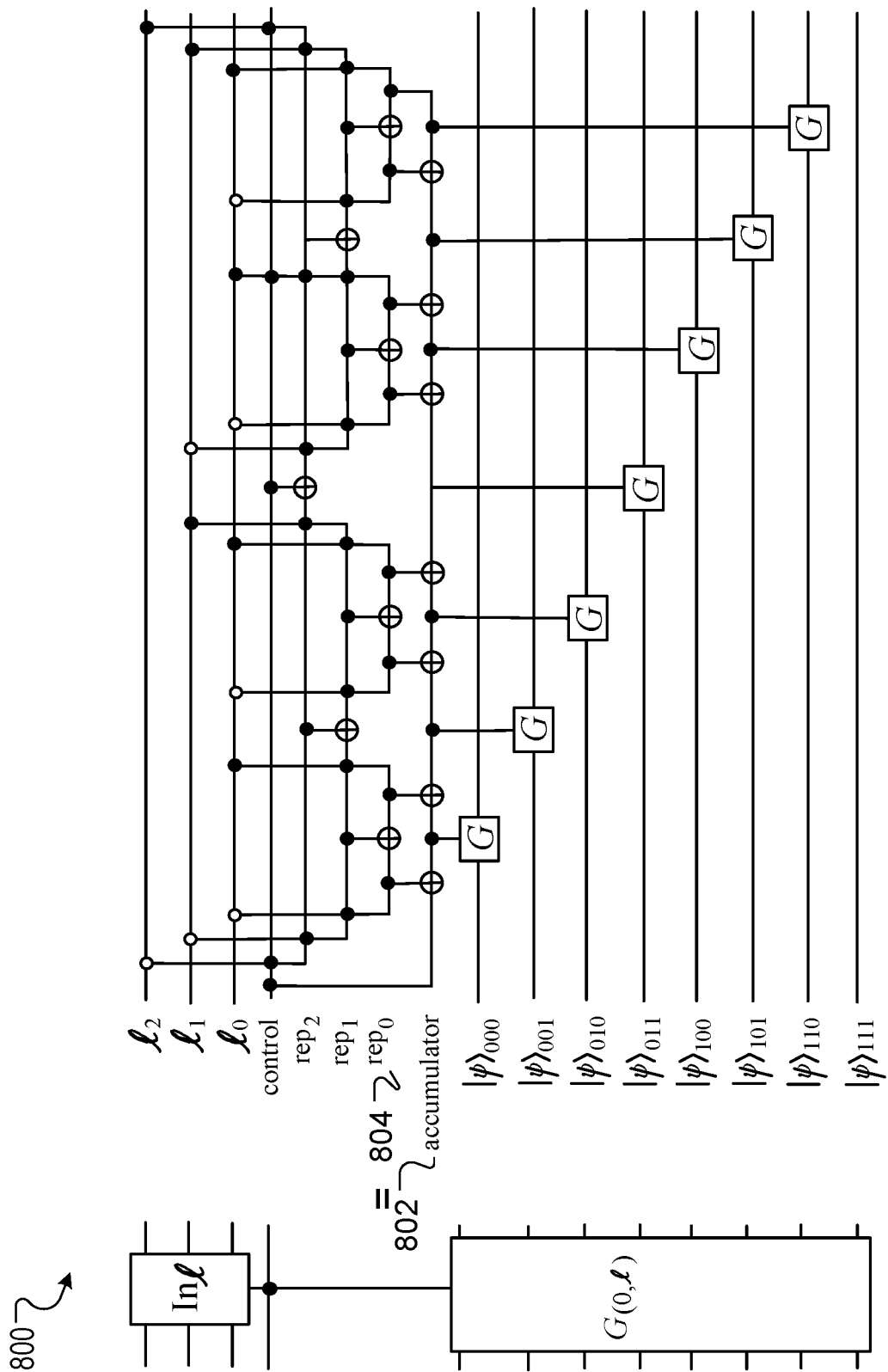
FIG. 8A shows an example unary iteration quantum circuit for performing ranged indexed operations.
Figure 8B:
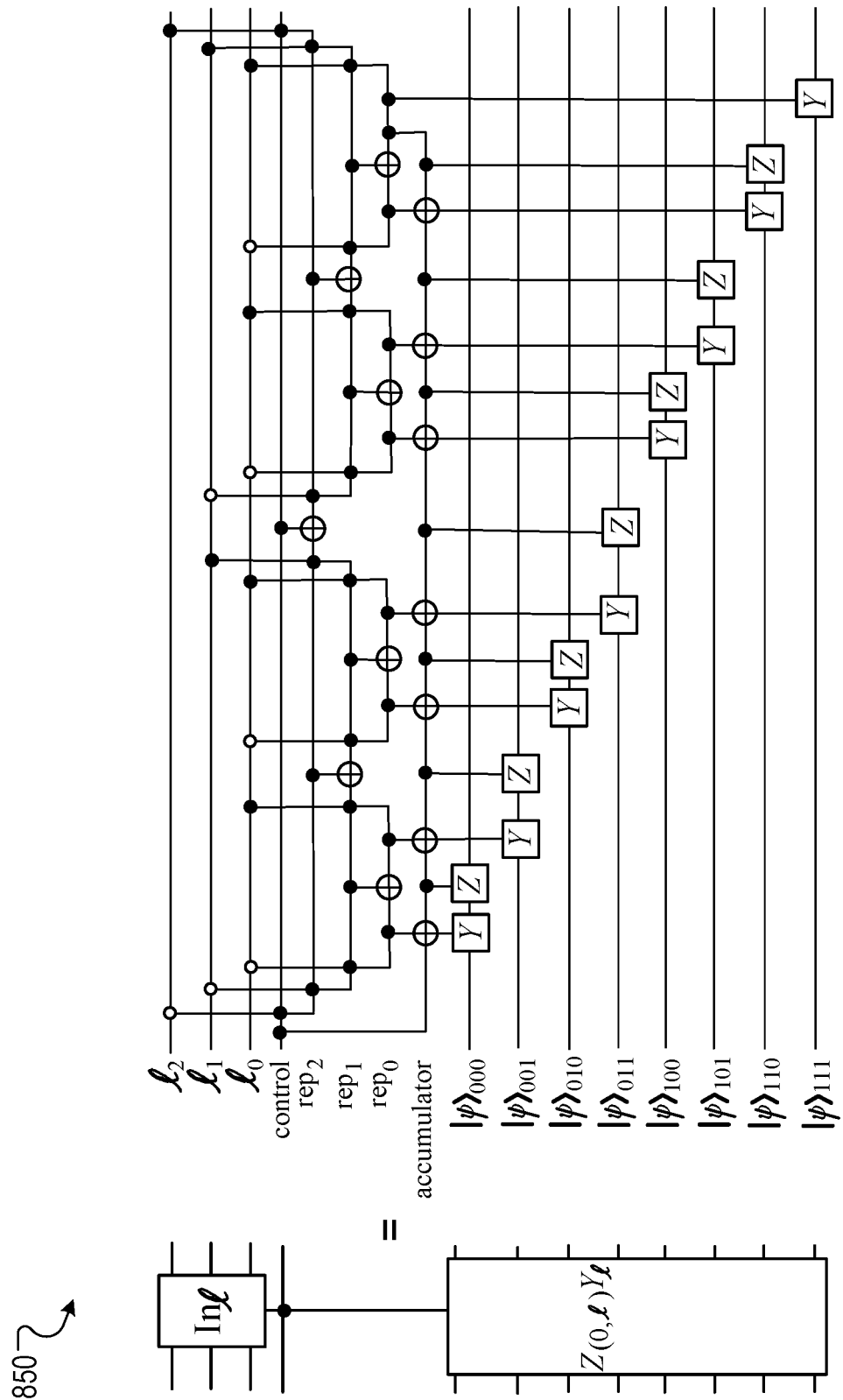
FIG. 8B shows an example unary iteration quantum circuit for performing both ranged indexed operations and indexed operations.

As another example, a unary iteration quantum circuit can be used to implement Pauli operations to sets of qubits that are any (classically pre-computed) function of the index register. As another variation, the target of each individually controlled operation can be easily changed and therefore the qubit to which the operation is applied does not need to match the value of the index register. The indexed operations that are being applied to the target register do not need to be the same across the whole target register. The indexed operation $G_l$ could, for example, be defined as $G_l = X_l$ when l<10 and $G_l = Y_l$ when l≥10, $X_l$ denotes a Pauli-X or NOT operation and $Y_l$ a Pauli-Y operation. In addition, the indexed operations can include ranged operations, as described below with reference to FIGS. 8A and 8B.

In some cases unary iteration quantum circuits can be optimized to reduce circuit depth, as illustrated below with reference to FIG. 6. In some cases unary iteration quantum circuits can be mapped, filtered, zipped, aggregated, batched, flattened, or grouped. Unary iteration quantum circuits can be applied in various settings, such as data loading, as described below with reference to FIGS. 10 and 11.

Figure 6:
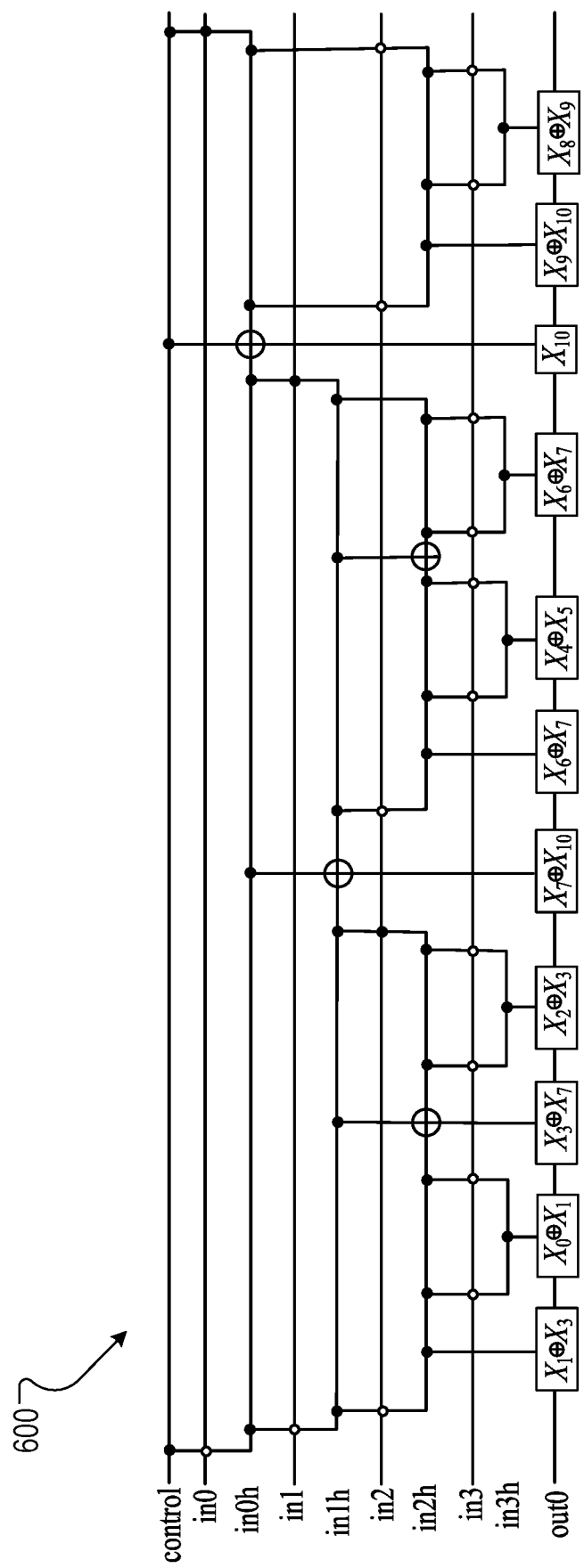
FIG. 6 shows an example optimized unary iteration quantum circuit.

FIG. 6 shows an example optimized unary iteration quantum circuit 600. The example optimized unary iteration quantum circuit 600 is an optimized version of the example unary iteration quantum circuit 500 shown in FIG. 5. The example unary iteration quantum circuit 500 has been optimized by merging CNOT operations, thus reducing circuit depth. The merging strategy is as follows. CNOTs can be merged when they are adjacent and have the same control. To create a situation where this is possible, CNOTs must be moved around and, in particular, over other CNOTs. When the order in which (i) a CNOT from qubit B onto qubit C and (ii) a CNOT from qubit A onto qubit B is swapped, a third CNOT from qubit A onto qubit C must be introduced to compensate for the fact that the swapped operations do not commute. But, if this new operation can be merged with existing CNOTs and swapping the order of the original operations allows one of them to be merged with yet another CNOT operation, then a small depth saving is achieved, since one operation was introduced but two mergers were performed. In the specific case of FIG. 5 above, the order of the $X_l$ CNOT and the CNOT to its left can be swapped. This will introduce an $X_l$ controlled by in2h, but it can be merged into the CNOT already controlled by in2h. Then the original controlled $X_l$ can be merged into the controlled $X_0$. The general strategy is to consider each operation in turn, swap it as far left as possible, and repeat until the circuit reached a stable state. Then check whether there are any operations that could be merged by moving right, without creating a situation that would introduce new CNOTs, and use those opportunities.

Figure 7:
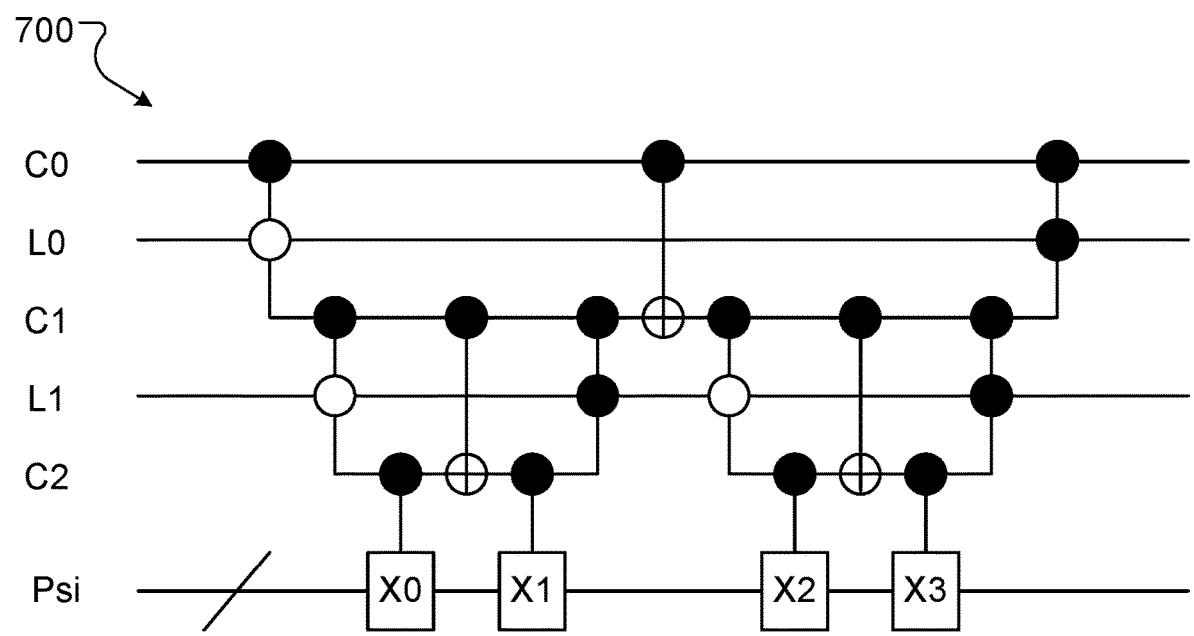
FIG. 7 shows a further example unary iteration quantum circuit.

An additional example of a unary iteration quantum circuit with fewer target qubits than the example shown in FIG. 5 is illustrated in FIG. 7. FIG. 7 shows a second example unary iteration quantum circuit 700 with four target qubits, two index qubits and three control qubits.

FIG. 8 shows an example unary iteration quantum circuit 800 for performing ranged indexed operations. Although the circuit 800 illustrates the index register and control register separately (and not interleaved, as in FIG. 5), the unary iteration techniques performed by the circuit 800 are equivalent to those performed by the circuit 500 of FIG. 5.

In a ranged indexed operation, an operation G is applied to multiple target qubits instead of just a single target qubit. An example ranged operation is given below in Equation (2).

$$|l\rangle |\psi\rangle \to |l\rangle G_0 \cdot G_1 \cdot \ldots \cdot G_{l-1}|\psi\rangle = |l\rangle \Pi_{k=0}^{l-1} G_k |\psi\rangle \qquad (2)$$

In Equation (2), $G_0 \cdot G_1 \cdot \ldots \cdot G_{l-1}$ represents a ranged operation that applies the operation G to target qubits $\psi_0, \psi_1, \ldots, \psi_{l-1}$.

The unary iteration quantum circuit described in this specification can be extended and used to implement such ranged indexed operations using additional accumulator qubits, e.g., accumulator qubit 802. Each time the final control qubit 804 is computed, a CNOT operation is performed between the additional accumulator qubit 802 and the final control qubit 804, with the final control qubit 804 acting as the control. As a result, the accumulator qubit 802 will remain in an ON state until the $l^{th}$ final control qubit 804 toggles it OFF. The accumulator qubit 802 will then remain in an OFF state. By conditioning indexed operations on the accumulator qubit 802 instead of on the final control qubit 804, the circuit can perform ranged indexed operations.

Various extensions of the circuit 800 are possible. For example, in some cases multiple accumulator qubits may be used to perform multiple operations over different ranges As another example, in some cases a unary iteration quantum circuit may perform both ranged index operations and indexed operations, as illustrated in circuit 850 of FIG. 8B. Since an accumulator qubit can be cleared without having to repeat the unary iteration process, performing ranged indexed operations and indexed operations does not increase the T-count.

Method for Performing Indexed Operations

FIG. 9 is a flowchart of an example process 900 for performing an indexed operation using a unary iteration quantum circuit. For convenience, the process 900 will be described as being performed by a quantum computing device in communication with one or more classical computing devices located in one or more locations. For example, the system 1200 of FIG. 12, appropriately programmed in accordance with this specification, can perform the process 900.

The system encodes an index value in an index register including one or more index qubits (step 902). For example, as illustrated above with reference to FIG. 5, the system may include an index register with N qubits and encode an index value 1 with $0 \leq l \leq 2^N - 1$. In some cases the index register may not encode an out-of-range value $l \geq 2^N$.

The system encodes the index value in a control register including multiple control qubits (step 904). Encoding the index value in the control register may include iteratively computing multiple logical AND operations between respective pairs of control qubits and index qubits to store a result of a logical AND operation between an inverse of a least significant index qubit and a penultimate control qubit storing a result of a previous logical AND operation in a final control qubit.

For example, as illustrated above with respect to FIG. 5, the index qubits may be interleaved with the control qubits, with a first control qubit at the top of the combined register, followed by a most significant index qubit, followed by a second control qubit, followed by a second most significant index qubit, etc., until a penultimate control qubit is followed by a least significant index qubit then a final control qubit. In this case, iteratively performing computing multiple logical AND operations between respective pairs of control qubits and index qubits to store a result of a logical AND operation between an inverse of the least significant index qubit and a control qubit storing the result of a previous logical AND operation may include, for a first iteration, performing a logical AND operation between the first control qubit (optionally prepared in an ON state) at the top of the combined register and an inverse of the most significant index qubit. The result of the logical AND operation may then be stored in the second control qubit. In this manner, the multiple control qubits are made available in sequence and not in parallel and correspond to a one-hot encoding of the stored index value.

For a subsequent iteration, performing computing multiple logical AND operations between respective pairs of control qubits and index qubits to store a result of a logical AND operation between an inverse of a lower significant index qubit and a control qubit storing the result of a previous logical AND operation may include performing a logical AND operation between a control qubit storing the result of a logical AND operation for the previous iteration and an inverse of the index qubit for the iteration, and storing the result of the logical AND operation in a subsequent control qubit. For example, for a second iteration this may include performing a logical AND operation between the second control qubit and an inverse of the second most significant index qubit. The result of the logical AND operation may then be stored in the third control qubit. For a final iteration, this may include performing a logical AND operation between the penultimate control qubit and an inverse of the least most significant index qubit. The result of the logical AND operation may then be stored in the final control qubit.

As described above with reference to FIG. 5 and illustrated above with reference to FIG. 2, in some implementations performing a logical AND operation may include performing a temporary AND operation that is defined in terms of Toffoli gates and Clifford+T gates and that requires 4 T gates.

The system repeatedly computes and uncomputes the control qubits to perform, conditioned on the state of the control qubits, the operation on a target qubit corresponding to the index value (step 906). Computing and uncomputing one or more control qubits may include repeatedly, for each target qubit in sequence:

a) determining whether the final control qubit is in an ON state, and in response to determining that the final control qubit is in an ON state, performing the operation on the target qubit;

b) determining a number of uncomputations of the iteratively computed logical AND operations described with reference to step 904 to perform;

c) performing the determined number of uncomputations;

d) performing a CNOT operation between a control qubit corresponding to the last uncomputed logical AND operation and a next highest control qubit, wherein the next highest control qubit acts as a control for the CNOT operation;

e) iteratively computing a number of logical AND operations as described above with reference to step 904 to recompute the final control qubit.

Determining a number of uncomputations of the iteratively computed logical AND operations described with reference to step 904 to perform includes determining how many bits are flipped when changing the binary representation of an index value corresponding to a final control qubit to the next (or, equivalently, the number of times it is possible to divide the index value in base 10 by 2 before the result becomes a non-integer). The number of uncomputations to perform is then equal to the determined number of required bit flips minus 1. Alternatively, the number of uncomputations to perform is equal to the number of times the value of the next index value can be divided by 2 before a non-integer result is obtained.

For example, after each even index value, only one bit flip is required to change the binary representation of the even index value to the next odd value. Therefore, after each even index value no uncomputations are performed, and the method described above includes only steps a) and d).

After each odd index value, different numbers of bit flips are required to change the binary representation of the odd index value to the next even value. For example, to change a bit representation for an index value 3→011 to 4→100 three bit flips are required. Therefore, the number of uncomputations determined and performed at steps b) and c) above is equal to 2. Alternatively, the number of times the value 4 can be divided by 2 before a non-integer result is obtained is 2.

In some implementations, as shown in FIG. 5, the steps a) to e) described above may vary for a last target qubit in the circuit. For example, as shown in FIG. 5, in cases where a final bit flip is left, e.g., in this example to go from index value 9 to 10, steps d) and e) for target qubit 9 and steps a), b) and c) for target qubit 10 may vary. This is because the circuit is truncated at index value 10—there are no target qubits corresponding to index values 12 to 15—and therefore the same amount of information encoded into the final control qubit for the previous index values is not required. Instead, the encoded information in the second least significant bit is sufficient, and performing one less AND computation/uncomputation can further reduce the T count.

The last question is in part also answered by this. In addition you use the penultimate here because you can because there is no additional differentiation necessary since there is no $X_{11}$. In other words the value of the second least significant bit is already sufficient in this particular case. And then you also want to do that if it is possible because it saves you one or more AND computations which require costly T gates In some implementations, the system may further uncompute the iteratively computed multiple logical AND operations between respective pairs of control qubits and index qubits, as described above with reference to step 902, to reset the index register to encode the index value.

As described above with reference to FIG. 5, the total number of AND operations included in the unary iteration circuit performing the index operation is equal to the total number of distinct operations on the target qubits $2^N$ minus 1. Therefore, in implementations where performing the AND operations requires 4 T gates per AND operation, the unary iteration circuit has a T count of $4(2^N-1)$.

Figure 10:
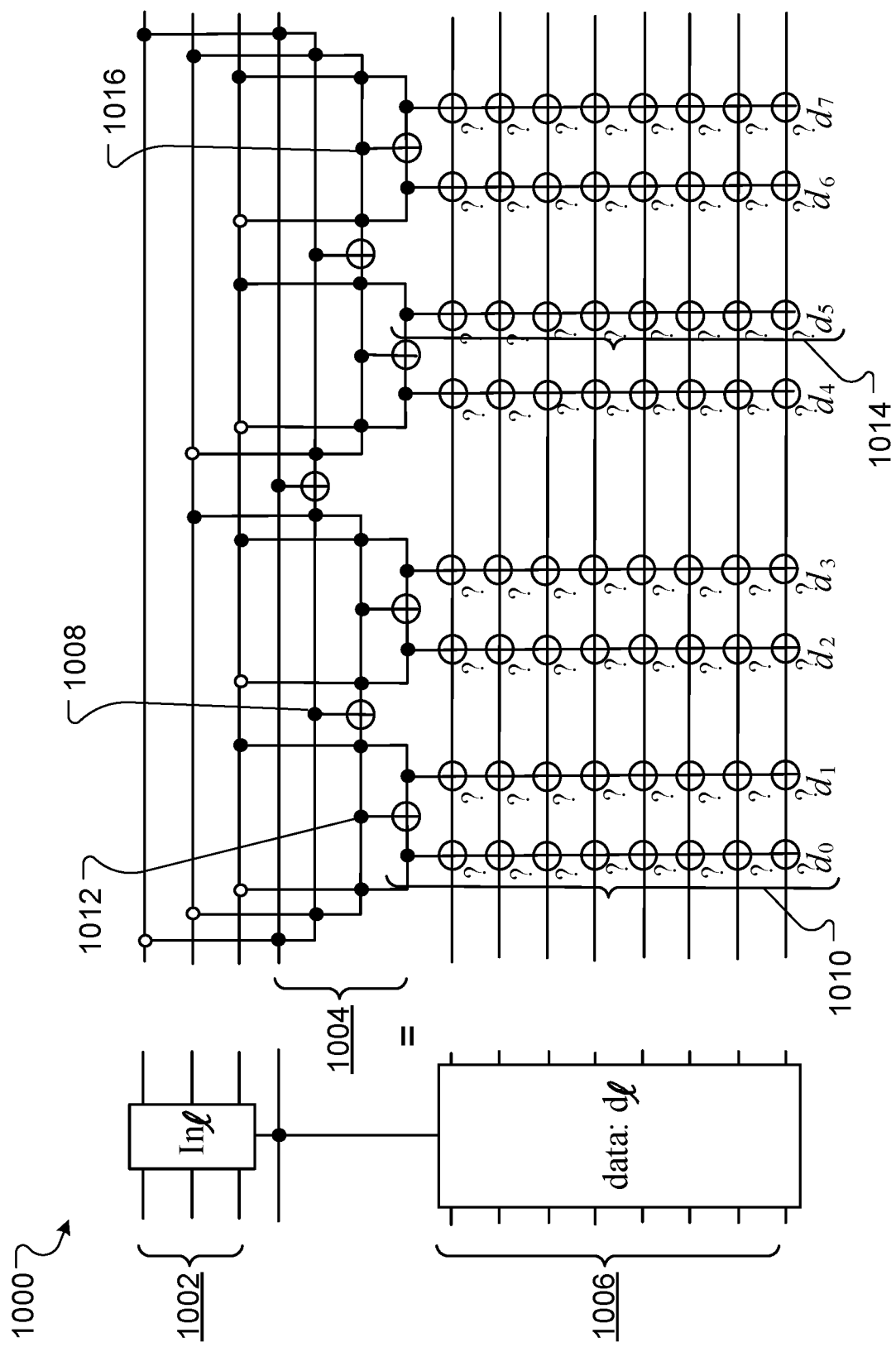
FIG. 10 shows an example data loading circuit.

Application of Unary Iteration to Data Loading:

FIG. 10 shows an example data loading quantum circuit 1000. For convenience, the example data loading quantum circuit 1000 is illustrated as being configured to load 8 data items, however in some cases the circuit may be expanded (or reduced) and configured to load an arbitrary number of data items.

The example data loading quantum circuit 1000 includes an index register 1002 including three index qubits. The upper most index qubit represents the most significant bit, and the lowest index qubit represents the least significant bit. The index register 1002 is configured to store an index value. As described above with reference to FIG. 5, in some implementations the index register may be configured to encode only in-range index values, i.e., index values less than L.

The example data loading quantum circuit 1000 includes a control register 1004 including four control qubits. In this description (and as describe above with reference to FIG. 5), the lowest control qubit is referred to as the final control qubit. The example data loading quantum circuit 1000 also includes a data register 1006 including eight data qubits.

The control register 1004 encodes the index value encoded in the index register 1002 via an iterative cascade of multiple logical AND operations performed between respective pairs of control qubits and index qubits, where each control qubit is made available to the cascade of operations in sequence and not in parallel. This process is described in detail above with reference to FIG. 5. At the end of the iterative cascade, the result of a logical AND operation between an inverse of the index qubit representing the least significant bit and the penultimate control qubit storing a result of a previous logical AND operation is stored in the final control qubit. Each logical AND operation may be implemented using the circuitry described above with reference to FIG. 2.

The example data loading quantum circuit 1000 repeatedly computes and uncomputes the control qubits to load a data item, e.g., one of data items $d_0$-$d_7$, corresponding to the index value to the data register of data qubits. In between each repetition, a CNOT operation is performed between the last uncomputed control qubit and the next most highest control qubit, with the next most highest control qubit acting as the control. For example, between repetition 1 and repetition 2, a CNOT gate 1008 is performed between the third control qubit and the second control qubit, with the second control qubit acting as the control. Between repetition 2 and 3, a CNOT gate is performed between the second control qubit and the first control qubit, with the first control qubit acting as the control.

The number of repetitions included in a data loading quantum circuit depends on the number of distinct data loading operations and/or the number of index qubits in the index register. For example, the example data loading quantum circuit 1000 includes three index qubits and eight distinct data loading operations. Therefore, in this case, the number of compute/uncompute repetitions is equal to 4.

A repetition of computing and uncomputing the control qubits includes iteratively computing one or more logical AND operations between pairs of control and index qubits to store a result of the computations in the final control qubit. If the final control qubit is in an ON state, a multi target CNOT operation is performed on the data register qubits with the final control qubit acting as a control for the multi target CNOT operation. The multi target CNOT operation is dependent on a binary encoding of the data item. For example, if the data item has a binary representation of 10000001, the multi target CNOT operation may include a multi target CNOT operation controlled by the final control qubit that targets the qubits in the data register at offset 0 and 7, i.e., applies CNOTs to the first and the last qubit in the data register. As another example, if the data item has a binary representation of 00001111, the multi target CNOT operation may include a multi target CNOT operation controlled by the final control qubit that targets the last four qubits in the data register.

A CNOT operation is then performed between the final control qubit and the penultimate control qubit, where the penultimate control qubit acts as the control for the CNOT operation. Then, if the final control qubit is in an ON state, a multi target CNOT operation is performed on the data register qubits, again where the multi target CNOT operation is dependent on a binary encoding of the data item. Pairs of control and index qubits are then iteratively uncomputed.

The number of iterative computations and uncomputations performed in a repetition depends which repetition is being performed. This concept is described in detail above with reference to FIG. 5.

The data loading quantum circuit 1000 ends by uncomputing the iteratively computed cascade of logical AND operations using a second cascade of uncomputations. Each control qubit is made available to the cascade of uncomputations in sequence and not in parallel.

The above described data loading quantum circuit 1000 and variations thereof can be used to construct a "read only" type of QRAM, referred to herein as QROM. A QROM can read classical data indexed by a quantum register using a data loading quantum circuit, i.e. perform the transformation given below in Equation (3), $$QROM_d \cdot \sum_{l=0}^{L-1} a_l |l\rangle |0\rangle = \sum_{l=0}^{L-1} a_l |l\rangle |d_l\rangle \quad (3)$$

In Equation (3), l represents an index to be read and $d_l$ represents a word at offset l in a classical list d containing L words (items of data), with each word consisting of D bits, and $a_l$ are arbitrary amplitudes. The left hand side of Equation (3) describes an arbitrary superposition over the index register's L possible values with a second register in the state

|0⟩ and the left-multiplication of $QROM_d$ indicates the application of the QROM circuit. The right hand side of Equation (3) describes the state resulting from the application of the QROM circuit which has the data bits $d_l$ in the second register entangled with each possible computational basis state of the first register.

The data loading quantum circuit 1000 (and therefore the QROM construction) has a gate complexity of O(L D), since each of the D bits in each of the L words or data items from the QROM determines whether or not a CNOT gate is present and it is possible that all of the QROM's bits are set. However, because the CNOT is a Clifford operation, it is cheap to apply. This is especially so for multi-target CNOT operations, which can be combined into a single braiding operation in the surface code. The T-count of the circuit comes entirely from the unary iteration process (and is independent of data item size) whose T-count is upper bounded by 4L−4.

Furthermore, since the T count is independent of data item size, the data item size can be (artificially) increased without affecting the T count by reading $d_l'$=concat($d_{2l}$, $d_{2l+1}$) instead of $d_l$. This changes the T-count from 4L to 2L+4D, which is beneficial as long as D is less than L/2.

Example Method for Performing Data Loading

Figure 11:
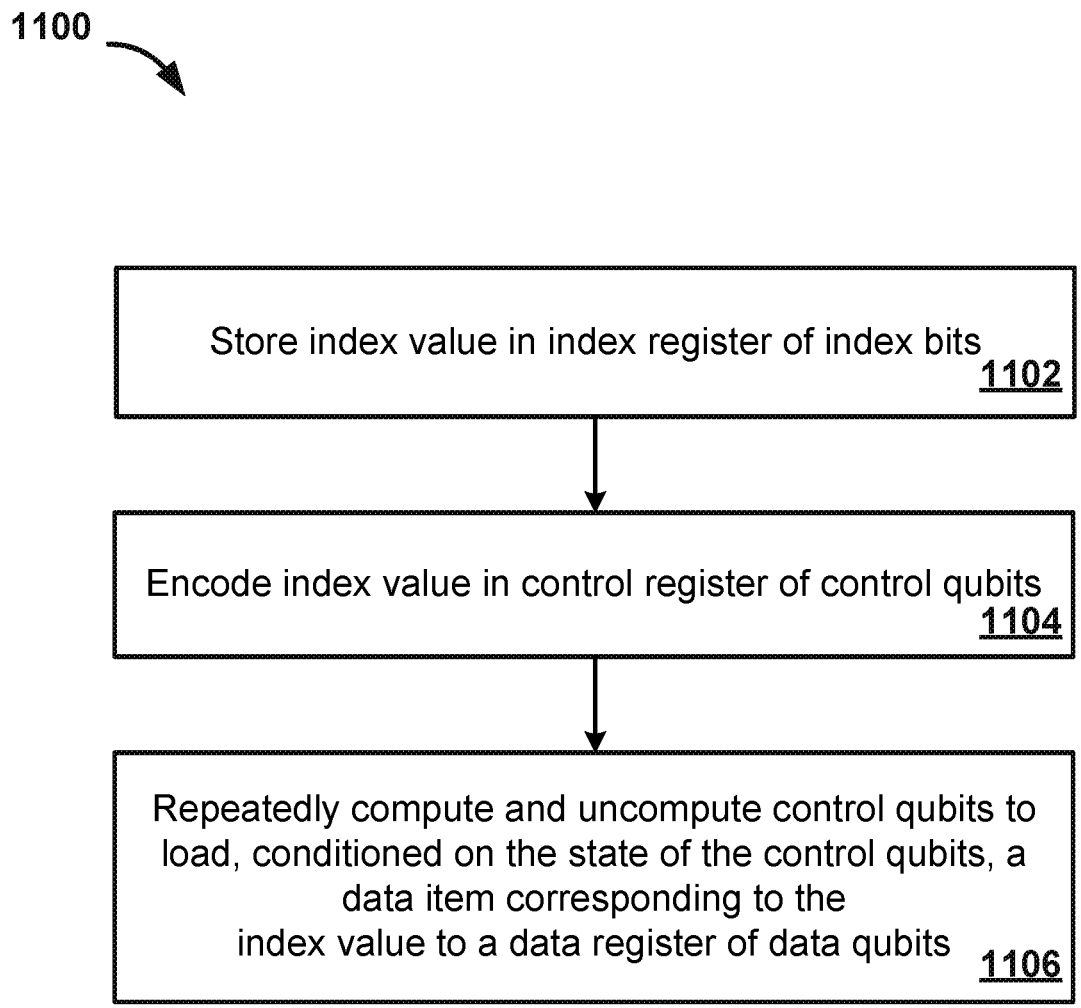
FIG. 11 is a flowchart of an example process for loading data using unary iteration techniques.

FIG. 11 is a flowchart of an example process 1100 for loading data using unary iteration techniques, e.g., the techniques described above with reference to FIGS. 5 to 9. For convenience, the process 1100 will be described as being performed by a quantum computing device in communication with one or more classical computing devices located in one or more locations. For example, the system 1200 of FIG. 12, appropriately programmed in accordance with this specification, can perform the process 1100.

The system encodes an index value in an index register comprising one or more index qubits (step 1102), wherein the index value may be obtained through the process of some larger quantum computation. For example, as illustrated above with reference to FIG. 10, the system may include an index register with N qubits and encode an index value l with $0 \leq l \leq 2^{N-1}$. In some cases the index register may not encode an out-of-range value $l \geq 2^{N-1}$.

The system encodes the index value in a control register comprising multiple control qubits (step 1104). Encoding the index value in the control register may include iteratively computing multiple logical AND operations between respective pairs of control qubits and index qubits to store a result of a logical AND operation between an inverse of a least significant index qubit and a penultimate control qubit storing a result of a previous logical AND operation in a final control qubit, as described in detail at step 904 of FIG. 9 above.

The system repeatedly computes and uncomputes the control qubits to load, conditioned on the state of the control qubits, a data item corresponding to the index value to a data register of data qubits (step 1106). Computing and uncomputing one or more control qubits may include repeatedly:

a) determining whether the final control qubit is in an ON state, and in response to determining that the final control qubit is in an ON state, performing a multi target CNOT operation on the data register qubits, wherein the multi target CNOT operation is dependent on a binary encoding of the data item and the final control qubit acts as the control for the multi target CNOT operation;

b) determining a number of uncomputations of the iteratively computed logical AND operations described with reference to step 904 to perform;

c) performing the determined number of uncomputations;

d) performing a CNOT operation between a control qubit corresponding to the last uncomputed logical AND operation and a next highest control qubit, wherein the next highest control qubit acts as a control for the CNOT operation;

e) iteratively computing a number of logical AND operations as described above with reference to step 904 to recompute the final control qubit.

As described above with reference to FIG. 9, determining a number of uncomputations of the iteratively computed logical AND operations to perform includes determining how many bits are flipped when changing the binary representation of an index value corresponding to a final control qubit to the next (or, equivalently, the number of times it is possible to divide the index value in base 10 by 2 before the result becomes a non-integer). The number of uncomputations to perform is then equal to the determined number of required bit flips minus 1. Alternatively, the number of uncomputations to perform is equal to the number of times the value of the next index value can be divided by 2 before a non-integer result is obtained.

For example, for a first repetition, a multi target CNOT operation 1010 is performed on the data register qubits 1006 if the final control qubit is in an ON state, with the multi target CNOT operation 1010 being dependent on a binary encoding of the data item do and the final control qubit acting as the control for the multi target CNOT operation 1010. No uncomputations are then performed. A CNOT operation 1012 is then performed between the final control qubit and a penultimate control qubit. No logical AND operations are then performed.

As another example, for a sixth repetition, a multi target CNOT operation 1014 is performed on the data register qubits 1006 if the final control qubit is in an ON state, with the multi target CNOT operation 1014 being dependent on a binary encoding of the data item $d_5$ and the final control qubit acting as the control for the multi target CNOT operation 1014. One uncomputation is then performed. A CNOT operation 1016 is then performed between the penultimate control qubit and a next highest control qubit. One logical AND operation is then performed.

In some implementations, the system may further uncompute the iteratively computed multiple logical AND operations between respective pairs of control qubits and index qubits, as described above with reference to step 1102, to reset the index register to encode the index value.

Example Hardware

Figure 12:
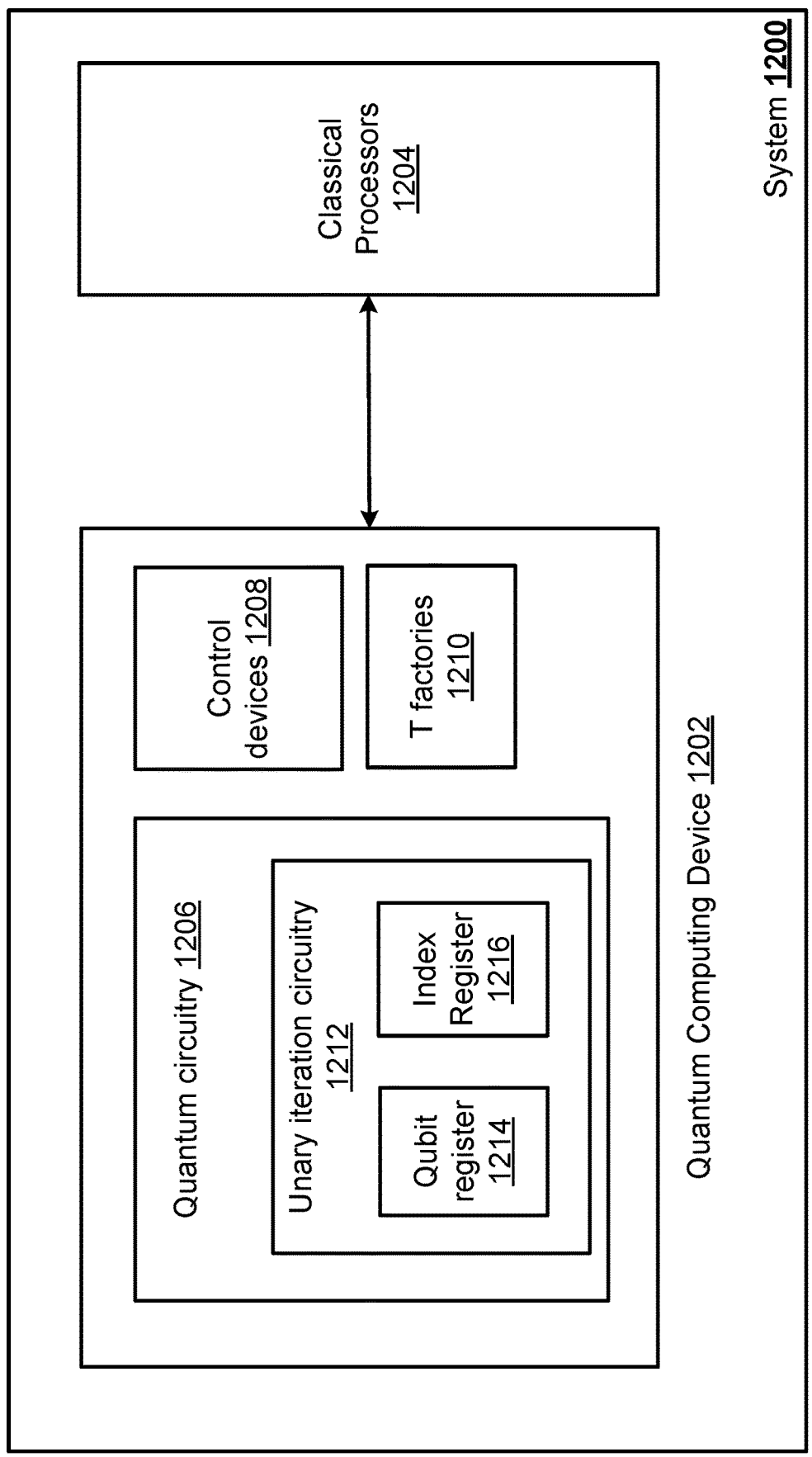
FIG. 12 shows an example system.

FIG. 12 depicts an exemplary system 1200 for implementing unary iteration quantum circuits and data loading quantum circuits. The system 1200 is an example of a system implemented as quantum or classical computer programs on one or more quantum computing devices or classical computers in one or more locations, in which the systems, components, and techniques described below can be implemented.

The system 1200 includes a quantum computing device 1202 in data communication with one or more classical processors 1204. For convenience, the quantum computing device 1202 and classical processors 1204 are illustrated as separate entities, however in some implementations the one or more classical processors may be included in quantum computing device 1202.

The quantum computing device 1202 includes components for performing quantum computation. For example, the quantum computing device 1202 includes quantum circuitry 1206, control devices 1208, and T factories 1210.

The quantum circuitry 1206 includes components for implementing a unary iteration quantum circuit 1212. For example, the quantum circuitry may include a quantum system that includes one or more multi-level quantum subsystems, e.g., a register of qubits 1214. The type of multi-level quantum subsystems that the system 1200 utilizes may vary. For example, in some implementations the multi-level quantum subsystems may be superconducting qubits, e.g., Gmon or Xmon qubits. In some cases it may be convenient to include one or more resonators attached to one or more superconducting qubits. In other cases ion traps, photonic devices or superconducting cavities (with which states may be prepared without requiring qubits) may be used. Further examples of realizations of multi-level quantum subsystems include fluxmon qubits, silicon quantum dots or phosphorus impurity qubits.

Quantum circuits comprising different quantum logic operations, e.g., single qubit gates, two qubit gates, and three qubit gates such as the logical AND operations as described above with reference to FIG. 2, may be constructed using the quantum circuitry 1206. Constructed quantum circuits can be operated/implemented using the control devices 1208. The type of control devices 1208 included in the quantum system depend on the type of qubits included in the quantum computing device. For example, in some cases the control devices 1208 may include devices that control the frequencies of qubits included in the quantum circuitry 1206, an excitation pulse generator and control lines that couple the qubits to the excitation pulse generator. The control devices may then cause the frequency of each qubit to be adjusted towards or away from a quantum gate frequency of an excitation pulse on a corresponding control driveline. The control devices 1208 may further include measurement devices, e.g., readout resonators. Measurement results obtained via measurement devices may be provided to the classical processors 1204 for processing and analyzing.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for performing unary iteration to implement an indexed operation using a quantum computing device comprising a unary iteration quantum circuit, the method comprising:
constructing the unary iteration circuit, comprising:
defining a total-control circuit for implementing the indexed operation, the total-control circuit comprising a control register comprising multiple control qubits, one or more target qubits, and an index register comprising multiple index qubits, wherein the index register is configured to encode a plurality of index values;
applying a set of transformations to the total-control circuit to generate a first transformed circuit, comprising, for each index value in the plurality of index values that is less than a maximum index value in the plurality of index values:

removing a control of the indexed operation on an index qubit representing $2^b$ when i) a result of a bitwise-or operator applied to the index value and $2^b$ is greater than or equal to the maximum index value and ii) a result of a bitwise-and operator applied to the maximum index value minus one and $2^b$ is equal to $2^b$; and expanding remaining controls of the indexed operation into nested AND operations;

applying a set of optimizations to the first transformed circuit to generate the unary iteration circuit, comprising, for each adjacent AND uncomputation and AND re-computation:

removing the adjacent AND uncomputation and AND re-computation when control types of the adjacent AND uncomputation and AND re-computation match;

replacing the adjacent AND uncomputation and AND re-computation with CNOT and NOT operations when no control types of the adjacent AND uncomputation and AND re-computation match; and replacing the adjacent AND uncomputation and AND re-computation with CNOT operations when one pair of control types of the adjacent AND uncomputation and AND re-computation match; and applying the constructed unary iteration circuit to the index register, the control register, and the one or more target qubits, comprising:

encoding, by the quantum computing device, an index value in the index register of the unary iteration quantum circuit, the index register comprising the multiple index qubits;

encoding, by the quantum computing device, the index value in the control register of the unary iteration quantum circuit, the control register comprising the multiple control qubits; and repeatedly computing and uncomputing, by the quantum computing device, control qubits from the multiple control qubits to perform, conditioned on a state of a final control qubit of the multiple control qubits, the indexed operation on the one or more target qubits of the unary iteration quantum circuit, the target qubits corresponding to the index value, wherein the state of the final control qubit specifies ON and OFF control types and wherein when the state is ON, the index operation is performed, and when the state is OFF, the indexed operation is not performed, and wherein during the encoding, computing, and uncomputing:

the multiple control qubits are made available in sequence, and the multiple control qubits correspond to a one-hot encoding of the encoded index value.

2. The method of claim 1, wherein encoding the index value in the control register of the unary iteration quantum circuit, the control register comprising multiple control qubits, comprises:

iteratively computing multiple logical AND operations between respective pairs of control qubits and index qubits to store a result of a logical AND operation between an inverse of a least significant index qubit and a penultimate control qubit storing a result of a previous logical AND operation in a final control qubit.

3. The method of claim 2, wherein iteratively computing multiple logical AND operations between respective pairs of control qubits and index qubits to store a result of a logical AND operation between an inverse of the least significant index qubit and a control qubit storing the result of a previous logical AND operation comprises:

for a first iteration, performing a logical AND operation between a first control qubit and an inverse of the most significant index qubit, and storing the result of the logical AND operation in a second control qubit; and for a subsequent iteration, performing a logical AND operation between a control qubit storing the result of a logical AND operation for the previous iteration and an inverse of the index qubit for the iteration, and storing the result of the logical AND operation in a subsequent control qubit.

4. The method of claim 3, wherein the first control qubit is initially set in an ON state.

5. The method of claim 2, wherein the multiple logical AND comprise temporary AND operations that are defined in terms of Toffoli gates and Clifford+T gates.

6. The method of claim 5, wherein each logical AND operation requires 4 T gates.

7. The method of claim 1, wherein repeatedly computing and uncomputing the control qubits from the multiple control qubits comprises repeatedly, for each target qubit in sequence:

determining whether a final control qubit is in an ON state, and in response to determining that the final control qubit is in an ON state, performing the indexed operation on the target qubit;

determining a number of uncomputations of the iteratively computed logical AND operations between respective pairs of control qubits and index qubits to perform;

iteratively performing the determined number of uncomputations;

performing a CNOT operation between a control qubit corresponding to a last uncomputed logical AND operation and a next highest control qubit, wherein the next highest control qubit acts as a control for the CNOT operation;

iteratively computing a number of logical AND operations between respective pairs of control qubits and index qubits to re-compute the final control qubit.

8. The method of claim 7, wherein determining a number of uncomputations of the iteratively computed logical AND operations between respective pairs of control qubits and index qubits to perform comprises:

determining how many bits are flipped when changing a binary representation of an index value corresponding to a final control qubit to the next; and determining the number of uncomputations as the determined number of bit flips minus one.

9. The method of claim 7, wherein determining a number of uncomputations of the iteratively computed logical AND operations between respective pairs of control qubits and index qubits to perform comprises determining a number of times it is possible to divide the index value in base 10 by 2 before a non-integer is obtained.

10. The method of claim 7, further comprising uncomputing the iteratively computed multiple logical AND operations between respective pairs of control qubits and index qubits to reset the index register to encode the index value.

11. The method of claim 7, further comprising merging the CNOT operations to generate an optimized unary iteration circuit for performing the indexed operation.

12. The method of claim 11, wherein performing the ranged indexed operation comprises applying CNOT operations between the accumulator qubit and each iterated final control qubit, the iterated final control qubit acting as the control.

13. The method of claim 1, wherein the total number of AND operations included in the unary iteration circuit is equal to the total number of target qubits N minus 1.

14. The method of claim 13, wherein performing the indexed operation has a T count of 4(L−1).

15. The method of claim 1, wherein the indexed operation comprises a ranged indexed operation, and wherein the unary iteration quantum circuit further comprises an accumulator qubit.

16. The method claim 1, wherein the nested AND operations are nested so that lower controls are inside higher controls.

17. The method claim 1, wherein during expansion of the remaining controls, a control qubit associated with an AND operation is placed directly below its lowest input qubit.

18. An apparatus comprising:
quantum computing hardware comprising:
  quantum circuitry for implementing a unary iteration quantum circuit, the quantum circuitry comprising:
    an index register comprising multiple index qubits, wherein the index register is configured to encode a plurality of index values;
    a control register comprising multiple control qubits;
    a system register comprising multiple target qubits;
  one or more control devices configured to operate the quantum circuitry; a classical processor in data communication with the quantum computing hardware;
wherein the apparatus is configured to cause the quantum circuitry and classical processor to perform operations comprising:
constructing, by the classical processor, the unary iteration circuit, comprising:
  defining a total-control circuit for implementing the indexed operation;
  applying a set of transformations to the total-control circuit to generate a first transformed circuit, comprising, for each index value in the plurality of index values that is less than a maximum index value in the plurality of index values:
    removing a control of the indexed operation on an index qubit representing $2^b$ when i) a result of a bitwise-or operator applied to the index value and $2^b$ is greater than or equal to the maximum index value and ii) a result of a bitwise-and operator applied to the maximum index value minus one and $2^b$ is equal to $2^b$; and
    expanding remaining controls of the indexed operation into nested AND operations;
  applying a set of optimizations to the first transformed circuit to generate the unary iteration circuit, comprising, for each adjacent AND uncomputation and AND re-computation:
    removing the adjacent AND uncomputation and AND re-computation when control types of the adjacent AND uncomputation and AND re-computation match;
    replacing the adjacent AND uncomputation and AND re-computation with CNOT and NOT operations when no control types of the adjacent AND uncomputation and AND re-computation match; and
    replacing the adjacent AND uncomputation and AND re-computation with CNOT operations when one pair of control types of the adjacent AND uncomputation and AND re-computation match; and
applying, by the quantum circuitry, the constructed unary iteration circuit to the index register, the control register, and the one or more target qubits, comprising:
  encoding an index value in the index register;
  encoding the index value in the control register; and
  repeatedly computing and uncomputing control qubits from the multiple control qubits to perform, conditioned on a state of a final control qubit of the multiple control qubits, the indexed operation on one or more target qubits of the multiple target qubits, the one or more target qubits corresponding to the index value, wherein the state of the final control qubit specifies ON and OFF control types and wherein when the state is ON, the index operation is performed, and when the state is OFF, the indexed operation is not performed, and wherein during the encoding, computing, and uncomputing:
    the multiple control qubits are made available in sequence, and
    the multiple control qubits correspond to a one-hot encoding of the encoded index value.

19. A method for operating a quantum read-only memory, the method comprising:
constructing a unary iteration circuit, comprising:
  defining a total-control circuit for implementing an indexed operation, the total-control circuit comprising a control register comprising multiple control qubits, a data register comprising one or more data qubits, and an index register comprising one or more index qubits, wherein the index register is configured to encode a plurality of index values;
  applying a set of transformations to the total-control circuit to generate a first transformed circuit, comprising, for each index value in the plurality of index values that is less than a maximum index value in the plurality of index values:
    removing a control of the indexed operation on an index qubit representing $2^b$ when i) a result of a bitwise-or operator applied to the index value and $2^b$ is greater than or equal to the maximum index value and ii) a result of a bitwise-and operator applied to the maximum index value minus one and $2^b$ is equal to $2^b$; and
    expanding remaining controls of the indexed operation into nested AND operations;
  applying a set of optimizations to the first transformed circuit to generate the unary iteration circuit, comprising, for each adjacent AND uncomputation and AND re-computation:
    removing the adjacent AND uncomputation and AND re-computation when control types of the adjacent AND uncomputation and AND re-computation match;
    replacing the adjacent AND uncomputation and AND re-computation with CNOT and NOT operations when no control types of the adjacent AND uncomputation and AND re-computation match; and replacing the adjacent AND uncomputation and AND re-computation with CNOT operations when one pair of control types of the adjacent AND uncomputation and AND re-computation match; and
applying the constructed unary iteration circuit to the index register, the control register, and the data register, comprising:
encoding, by a quantum computing device, an index value in the index register comprising the one or more index qubits;
encoding, by the quantum computing device, the index value in the control register comprising the multiple control qubits; and
repeatedly computing and uncomputing, by the quantum computing device, control qubits from the multiple control qubits to load, conditioned on a state of a final control qubit of the multiple control qubits, a data item corresponding to the index value to the data register of data qubits, wherein the state of the final control qubit specifies ON and OFF control types and wherein when the state is ON, the data item is loaded to the data register, and when the state is OFF, the data item is not loaded to the data register, and wherein during the encoding, computing and uncomputing:
the multiple control qubits are made available in sequence, and
the multiple control qubits correspond to a one-hot encoding of the stored index.

20. The method of claim 19, wherein encoding the index value in the control register comprising multiple control qubits comprises:
iteratively computing multiple logical AND operations between respective pairs of control qubits and index qubits to store a result of a logical AND operation between an inverse of a least significant index qubit and a penultimate control qubit storing a result of a previous logical AND operation in a final control qubit.

21. The method of claim 20, wherein iteratively computing multiple logical AND operations between respective pairs of control qubits and index qubits to store a result of a logical AND operation between an inverse of the least significant index qubit and a control qubit storing the result of a previous logical AND operation comprises:
for a first iteration, performing a logical AND operation between a first control qubit and an inverse of the most significant index qubit, and storing the result of the logical AND operation in a second control qubit; and
for a subsequent iteration, performing a logical AND operation between a control qubit storing the result of a logical AND operation for the previous iteration and an inverse of the index qubit for the iteration, and storing the result of the logical AND operation in a subsequent control qubit.

22. The method of claim 21, wherein the first control qubit is initially set in an ON state.

23. The method of claim 20, wherein the multiple logical AND operations comprise temporary AND operations that are defined in terms of Toffoli gates and Clifford+T gates.

24. The method of claim 20, wherein each logical AND operation require 4 T gates.

25. The method of claim 19, wherein repeatedly computing and uncomputing the control qubits comprises, for each repetition:
determining whether a final control qubit is in an ON state;
in response to determining that the final control qubit is in an ON state, performing a multi target CNOT operation on the data register qubits, wherein the multi target CNOT operation is dependent on a binary encoding of the data item and is controlled by the final control qubit;
determining a number of uncomputations of the iteratively computed logical AND operations between respective pairs of control qubits and index qubits to perform;
iteratively performing the determined number of uncomputations;
performing a CNOT operation between a control qubit corresponding to a last uncomputed logical AND operation and a next highest control qubit, wherein the next highest control qubit acts as a control for the CNOT operation;
iteratively computing a number logical AND operations between respective pairs of control qubits and index qubits to re-compute the final control qubit.

26. The method of claim 25, wherein determining a number of uncomputations of the iteratively computed logical AND operations between respective pairs of control qubits and index qubits to perform comprises:
determining how many bits are flipped when changing a binary representation of an index value corresponding to a final control qubit to the next; and
determining the number of uncomputations as the determined number of bit flips minus one.

27. The method of claim 25, wherein determining a number of uncomputations of the iteratively computed logical AND operations between respective pairs of control qubits and index qubits to perform comprises determining a number of times it is possible to divide the index value in base 10 by 2 before a non-integer is obtained.

28. The method of claim 19, further comprising uncomputing the iteratively computed multiple logical AND operations between respective pairs of control qubits and index qubits to reset the index register to encode the index value.

29. The method of claim 19, wherein the total number of AND operations included in a quantum read-only memory circuit is equal to the total number of data register qubits L minus 1.

30. The method of claim 19, wherein loading the data item has a T count of $4(L-1)$.

31. An apparatus comprising:
quantum computing hardware comprising:
a quantum read-only memory comprising:
an index register comprising multiple index qubits, wherein the index register is configured to encode a plurality of index values;
a control register comprising multiple control qubits;
a data register comprising multiple data qubits;
one or more control devices configured to operate the quantum read-only memory;
a classical processor in data communication with the quantum computing hardware;
wherein the apparatus is configured to cause the classical processor and the quantum read-only memory to perform operations comprising:
constructing, by the classical processor, a unary iteration circuit, comprising:
defining a total-control circuit for implementing an indexed operation;
applying a set of transformations to the total-control circuit to generate a first transformed circuit, comprising, for each index value in the plurality of index values that is less than a maximum index value in the plurality of index values:
  removing a control of the indexed operation on an index qubit representing $2^b$ when i) a result of a bitwise-or operator applied to the index value and $2^b$ is greater than or equal to the maximum index value and ii) a result of a bitwise-and operator applied to the maximum index value minus one and $2^b$ is equal to $2^b$; and
  expanding remaining controls of the indexed operation into nested AND operations;
applying a set of optimizations to the first transformed circuit to generate the unary iteration circuit, comprising, for each adjacent AND uncomputation and AND re-computation:
  removing the adjacent AND uncomputation and AND re-computation when control types of the adjacent AND uncomputation and AND re-computation match;
  replacing the adjacent AND uncomputation and AND re-computation with CNOT and NOT operations when no control types of the adjacent AND uncomputation and AND re-computation match; and
  replacing the adjacent AND uncomputation and AND re-computation with CNOT operations when one pair of control types of the adjacent AND uncomputation and AND re-computation match; and
applying, in the quantum read only memory, the constructed unary iteration circuit to the index register, the control register, and the data register, to cause the quantum read only memory to perform operations comprising:
  encoding an index value in the index register;
  encoding the index value in the control register; and
  repeatedly computing and uncomputing control qubits from the multiple control qubits to load, conditioned on a state of a final control qubit of the multiple control qubits, a data item corresponding to the index value to the data register, wherein the state of the final control qubit specifies ON and OFF control types and wherein when the state is ON, the data item is loaded to the data register, and when the state is OFF, the data item is not loaded to the data register, and wherein during the encoding, computing, and uncomputing:
  the multiple control qubits are made available in sequence, and
  the multiple control qubits correspond to a one-hot encoding of the stored index.

* * * * *